US012613760B2

(12) United States Patent
Patil et al.

(10) Patent No.: US 12,613,760 B2
(45) Date of Patent: Apr. 28, 2026

(54) SYSTEMS AND METHODS FOR GENERATING RECOMMENDATIONS BASED ON REAL-TIME MAPPING OF SYSTEM COMPONENTS IN SOFTWARE APPLICATIONS LINEAGE LOGS

(71) Applicant: Citibank, N.A., New York, NY (US)

(72) Inventors: Pranita Patil, New York, NY (US); Michael Naggar, New York, NY (US); Richard Lawton, New York, NY (US); Mayank Vinayaka, New York, NY (US); Dinakar Anumolu, New York, NY (US); Brendan Hall, New York, NY (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 19/195,642

(22) Filed: Apr. 30, 2025

(65) Prior Publication Data

US 2025/0307050 A1      Oct. 2, 2025

Related U.S. Application Data

(63) Continuation-in-part of application No. 18/762,362, filed on Jul. 2, 2024, now Pat. No. 12,314,150, and a continuation-in-part of application No. 18/951,366, filed on Nov. 18, 2024, which is a continuation of application No. 18/624,409, filed on Apr. 2, 2024, now Pat. No. 12,147,292.

(51) Int. Cl.
| | |
|---|---|
| *G06F 11/00* | (2006.01) |
| *G06F 11/07* | (2006.01) |
| *G06F 11/3668* | (2025.01) |

(52) U.S. Cl.
CPC ........ *G06F 11/0766* (2013.01); *G06F 11/079* (2013.01); *G06F 11/3688* (2013.01)

(58) Field of Classification Search
CPC . G06F 11/0766; G06F 11/079; G06F 11/3688
See application file for complete search history.

(56) References Cited

U.S. PATENT DOCUMENTS

| | | | |
|---|---|---|---|
| 2020/0409780 A1* | 12/2020 | Balasubramanian | ....................... G06F 9/3838 |
| 2023/0021373 A1* | 1/2023 | Kabbinale | ............... G06F 18/24 |
| 2024/0028442 A1* | 1/2024 | Harutyunyan | ...... G06F 11/0769 |
| 2024/0193077 A1* | 6/2024 | Alford | ................... G06N 3/088 |
| 2024/0394139 A1* | 11/2024 | Lushear | ............... G06F 11/079 |
| 2025/0080395 A1* | 3/2025 | Agarwal | ............. H04L 41/5074 |

* cited by examiner

*Primary Examiner* — Joshua P Lottich
(74) *Attorney, Agent, or Firm* — Foley & Lardner LLP

(57) ABSTRACT

Systems and methods for real-time mapping and visualization generation of system components. The system may receive a first user request to generate a first visualization of a first configuration of a first subset of components in a first software system. The system may, in response to the first user request, retrieve a first software applications lineage log, wherein the first software applications lineage log comprises a log of event data of current processes being performed in the first software system. The system may generate a first feature input based on the first software applications lineage log. The system may input the first feature input into a first artificial intelligence model to generate a first output.

20 Claims, 9 Drawing Sheets

200

204

202

206

210

212

Data Processor

Data Sources

System logs

Error Reports

Traces/ Metrics

Applications Inventory

Deployment logs

AI/ML Module

Data Pre-Processor

Data Analyzer

<NLP> Issue Descriptor

<GEN AI> Root-cause report generator

Data Repository

300

302a

306a

304a

400

<u>500</u>

Retrieve a software applications lineage log

502

Receive event data

504

Use an artificial intelligence model to generate an output based on software applications lineage log and event data

506

Determine a recommendation based on the output

508

Generate the recommendation

510

600

Receive a request

602

Receive event data

604

Use an artificial intelligence model to generate an output for a debug operation

606

Determine a first result

608

Determine a second result

610

Generate for display a recommendation based on the first and second results

612

SYSTEMS AND METHODS FOR GENERATING RECOMMENDATIONS BASED ON REAL-TIME MAPPING OF SYSTEM COMPONENTS IN SOFTWARE APPLICATIONS LINEAGE LOGS

CROSS-REFERENCE TO RELATED APPLICATIONS

This application is a continuation-in-part of U.S. patent application Ser. No. 18/762,362, filed Jul. 7, 2024. The content of the foregoing application is incorporated herein in its entirety by reference.

This application is also a continuation-in-part of U.S. patent application Ser. No. 18/951,366, filed Nov. 18, 2024, which is a continuation of U.S. patent application Ser. No. 18/624,409, filed Apr. 2, 2024. The contents of the foregoing applications are incorporated herein in their entirety by reference.

BACKGROUND

Modern computer systems have grown increasingly complex due to the expanding scope of their capabilities and the diverse requirements they are expected to meet. With the evolution of technology, processes are now tasked with handling vast amounts of data, supporting intricate software applications, and maintaining seamless connectivity across globally distributed software applications, cloud computing resources, and one or more microservices. This expansion requires sophisticated hardware architectures and advanced software designs, both of which need to be adaptable, secure, and efficient. Moreover, the integration of multiple subsystems, like processors, memory, networking, and storage, necessitates a careful orchestration to ensure optimal performance. The rise of cloud computing, IoT (Internet of Things), and artificial intelligence adds additional layers, as systems must interact with distributed resources and incorporate intelligent processing. Furthermore, modern systems must also be resilient against a growing landscape of cybersecurity threats and provide compliance with various regulatory standards, adding to the complexity. In this interconnected ecosystem, maintaining performance, security, scalability, and efficiency creates a challenging environment for globally distributed software applications.

SUMMARY

One approach to maintaining the performance, security, scalability, and/or efficiency of software systems and systems is to monitor and assess the various components of those networks and systems individually. Unfortunately, without understanding the connections, dependencies, and/or integrations of a given component, determining the upstream and/or downstream effects of a component is impossible. As such, the systems and method described herein for generating a mapping of dependencies across system components in a distributed architecture.

However, mapping dependency across system components in distributed architecture is technically challenging due to the dynamic, distributed, multi-tech and/or complex software systems. For example, modern infrastructures often involve multiple layers, from virtualization to application services, each with its own abstractions that obscure the underlying hardware. The distribution of these components across numerous data centers also makes it difficult to track their physical locations and interconnections, and cloud-based services may scale elastically, adding or removing resources based on demand, which makes the system topology highly fluid and ever-changing. Additionally, the presence of multi-tenant architectures, where different users and applications share resources while maintaining data and application isolation, further complicates mapping efforts due to the need to separate and accurately attribute resources to the right components. These technical challenges make comprehensive and accurate mapping of components a complex and often elusive task.

In view of the aforementioned technical challenges in mapping system components, systems and methods are described herein for novel functionality and/or improvements to mapping components in software systems. In particular, the systems and methods described herein allow for real-time mapping and visualization generation of system components and inter-system communications as well as for the generation of real-time recommendations for architectural recommendations. To achieve these technical benefits, the systems and methods generate hierarchical workflow mappings of a computational network using event data from software applications lineage logs as well as component and artifact repositories. For example, while event data in software applications lineage logs is conventionally limited to identifying that a given process occurred, the systems and methods use the plurality of events detailed in the software applications lineage logs to create, using an artificial intelligence model, a network mapping of how system components are arranged and interact.

Upon having generated the real-time mapping and visualizations of system components and inter-system communications, the system may perform numerous advantageous functions that would not previously be possible. For example, the system may utilize a software applications lineage log, which comprises a log of event data from a first process being performed by one or more components in a first software system, to determine which component is being used to perform a process and whether that component is functioning properly. By analyzing the event data recorded in the lineage log, the system can identify the specific components involved in executing the process based on the timestamps, event names, and component identifiers. The system can then generate a hierarchical workflow mapping of the computational network, using this event data to create a network mapping that shows how the system components are arranged and interact. This mapping allows the system to visualize the relationships between components and identify any dependencies or interactions that may affect the process. Additionally, the system can use historical software applications lineage logs to train an artificial intelligence model, which can then predict the expected behavior of the components based on the current event data. By comparing the actual performance of the components with the predicted behavior, the system can determine whether each component is functioning properly or if there are any anomalies that need to be addressed. This approach enables real-time monitoring and assessment of the system's performance, ensuring that any issues can be quickly identified and resolved to maintain optimal functionality.

For example, the system generates training data based on historical software applications lineage logs that indicate respective time stamps, event names, system components, and/or other data for known software systems performing known processes. The training data may then be used to allow the artificial intelligence model to determine the series in which different events occur, the correlations between those events, and/or the hierarchical relationships between components in software system based on inputted software applications lineage logs. Once trained, the artificial intelligence model may receive an input of a current software applications lineage logs to determine a programmatic component mapping. Having determined a component mapping, the system may generate visualizations of the relationships between the components as well as generate recommendations related to those relationships (e.g., configuration improvements, workflow redundancy reductions, etc.). Additionally or alternatively, the system may identify potential downstream effects of problems stemming from a given component (e.g., detected based on event data received related to that component) and identify potential impacts to subjected system(s) as a result of changes or enhancements in upstream components.

In some aspects, systems and methods for real-time mapping and visualization generation of system components as described. For example, the system may receive a first user request to generate a first visualization of a first configuration of a first subset of components in a first software system. The system may, in response to the first user request, retrieve a first software applications lineage log, wherein the first software applications lineage log comprises a log of event data of current processes being performed in the first software system. The system may generate a first feature input based on the first software applications lineage log. The system may input the first feature input into a first artificial intelligence model to generate a first output, wherein the first artificial intelligence model is trained by generating first training data based on historical software applications lineage logs that indicate respective time stamps, event names, components, or other data for known software system(s) configurations performing known processes; and training, using the first training data, the first artificial intelligence model to generate outputs comprises predicted software system(s) configurations based on inputs of current software applications lineage logs. The system may receive a first output from the first artificial intelligence model. The system may generate for display, on a user interface, the first visualization.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1A:
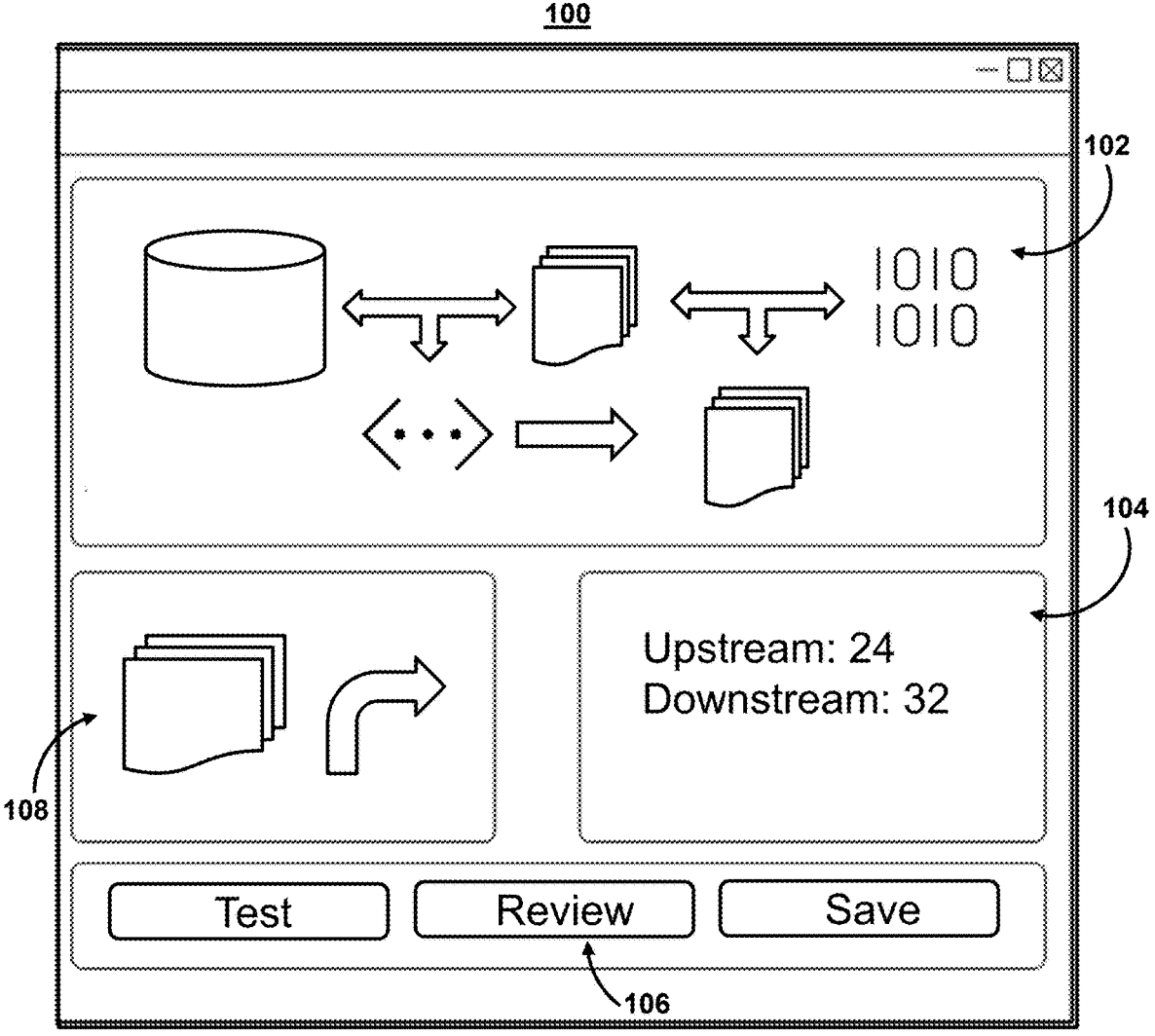
FIGS. 1A-IC show illustrative user interfaces displaying a visualization, in accordance with one or more embodiments.

FIGS. 1A-IC show illustrative user interfaces displaying a visualization, in accordance with one or more embodiments. FIG. 1A shows an illustrative user interface displaying a visualization, in accordance with one or more embodiments. For example, FIG. 1A shows user interface 100. As referred to herein, a "user interface" may comprise a human-computer interaction and communication in a device, and may include display screens, keyboards, a mouse, and the appearance of a desktop. For example, a user interface may comprise a way a user interacts with an application or a website. As referred to herein, "content" should be understood to mean an electronically consumable user asset, such as Internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but can also be part of a live performance. Furthermore, user generated content may include content created and/or consumed by a user. For example, user generated content may include content created by another, but consumed and/or published by the user.

User interface 100 (and the underlying system used to power user interface 100) may allow for real-time mapping and visualization generation of system components and inter-system communications. For example, real-time mappings and visualizations of system components and inter-system communications in a software system refers to the dynamic representation of the various elements and their interactions within a network as they occur (or would occur). These mappings may provide an up-to-the-moment depiction of hardware devices, such as servers, routers, switches, and endpoints, as well as software components, such as applications and services. The system may generate visualizations (e.g., visualization 102) on user interface 100 that display the physical and logical topology of the network, showing how components are connected and communicate with each other. The mapping and/or visualization can encompass data flows, packet transfers, and/or protocol exchanges, often represented through nodes and links, with varying colors and lines to indicate different types of connections and their statuses. For example, by employing techniques such as network traffic analysis and monitoring tools on software applications lineage logs, the system can determine mappings and create visualizations that help network administrators and IT professionals to quickly identify performance bottlenecks, detect anomalies and/or potential security threats, and ensure efficient and secure network operation.

For example, the system may generate hierarchical workflow mappings of a computational network using event data from software applications lineage logs as well as component and artifact repositories. The hierarchical workflow mappings of a computational network may refer to the structured representation of tasks and processes within a network, organized in layers of dependency and execution order. The system may generate a mapping that indicates how complex workflows are broken down into simpler, manageable components, often depicted in a tree-like structure. The system may then generate a visualization (e.g., visualization 102) based on this mapping. At the highest level, overarching processes or tasks may be displayed in a visualization (e.g., visualization 102), which may then be decomposed into sub-tasks or subprocesses at subsequent levels.

In some embodiments, a given component (e.g., a node, task, function, process, etc., in the mapping) may be selected as shown in icon 108. Each component in the hierarchy may represent a specific computational task or function, while the connections between nodes indicate the flow of data and control from one task to another. This hierarchical approach helps to illustrate the sequence and interdependencies of operations, ensuring that each task is completed before dependent tasks are initiated. By visualizing the entire workflow in a structured manner, these mappings enable more effective planning, monitoring, and optimization of computational processes. The system may also generate additional information (e.g., information 104) related to a component such as the connections and interdependencies.

For example, user interface 100 may generate real-time mappings and visualizations of system components and inter-system communications as well as additional information about the mapping, network, and/or one or more components. This additional information may include detailed metrics such as upstream/downstream dependencies and/or effects, bandwidth usage, latency, packet loss, and/or error rates for each connection and/or component, which may help in assessing the performance and health of the network. User interface 100 can also offer insights into the status of individual devices, such as CPU load, memory usage, and disk activity, allowing administrators to identify and address potential issues at the device level. Additionally, real-time alerts and notifications can be integrated to inform users of any anomalies, security threats, and/or performance degradations as they occur, enabling prompt response and mitigation. Visualization tools may include historical data and trend analysis, helping users to recognize patterns and predict future behavior. Interactive elements, such as zooming, filtering, and drill-down capabilities, enable users to focus on specific areas of interest or concern, providing a more granular view of the network's operation. Furthermore, integration with other network management tools and databases can enrich the visualizations with contextual information, such as device configurations, policy compliance, and user activity logs, leading to a more comprehensive understanding of the network environment.

User interface 100 may also be used to test specific components, save mappings and/or visualizations of configurations of components, and/or review mappings, visualizations, and/or components. For example, user interface 100 may include a plurality of icons (e.g., icon 106). For example, user interface 100 may be designed for managing and visualizing network components, and their configurations can offer a range of icons and interactive elements that enhance usability and functionality. To test specific components, user interface 100 may include icons representing various diagnostic tools, such as ping tests, traceroutes, and performance benchmarks. These icons (e.g., icon 106), often shaped like tools or diagnostic symbols, allow users to initiate tests with a simple click, providing real-time feedback on the status and performance of individual components. For saving mappings and visualizations, user interface 100 might feature icons resembling floppy disks, clouds, or folders, enabling users to store their current network configurations and visualizations locally or in the cloud. This ensures that users can easily retrieve and review their saved configurations later.

Additionally, user interface 100 can include icons for reviewing past mappings, visualizations, and component statuses. These icons, which may be depicted as magnifying glasses, history symbols, or document stacks, provide access to logs and historical data, allowing users to compare current network states with previous ones. Interactive features such as hover-over tooltips, clickable nodes, and context menus enhance these icons, offering detailed information and additional options without cluttering the main display. By incorporating these intuitive icons and interactive elements, user interface 100 simplifies complex network management tasks, making it easier for users to monitor, diagnose, save, and/or review their components, configurations, and/or performance metrics thereof effectively.

The system may generate real-time mappings and visualizations of system components and inter-system communications, as well as additional information about the mapping, network, and/or one or more components using event data in software applications lineage logs. Event data in a software applications lineage log may refer to a record of specific actions and/or occurrences within a software system. The event data may include timestamps, event types, user actions, system processes, data modifications, and/or interactions between different components or systems. For example, an event may be logged when data is ingested, transformed, queried, moved, and/or deleted, along with metadata about the source and destination of the data, the nature of the transformation, and the identities of the users or systems involved. By maintaining a comprehensive log of these events, the software applications lineage log may provide a transparent and auditable trail that helps in understanding how data is processed through a network and/or the components in that network.

In some embodiments, event data may be archived in a software applications lineage log through a systematic process that ensures the information is accurately captured, securely stored, and easily retrievable for future reference. When an event occurs within the network, the system may immediately (and/or at a predetermined frequency) record the event (or event data) in the software applications lineage log. The system may use a standardized and consistent data representation such as JSON or XML. Each log entry may include key details such as time stamps, event types, user and/or component identifiers, data sources and destinations, and descriptions of the actions performed. This log data is then stored in a centralized repository, often a dedicated database or a distributed storage system, designed to handle large volumes of data efficiently.

Figure 1B:
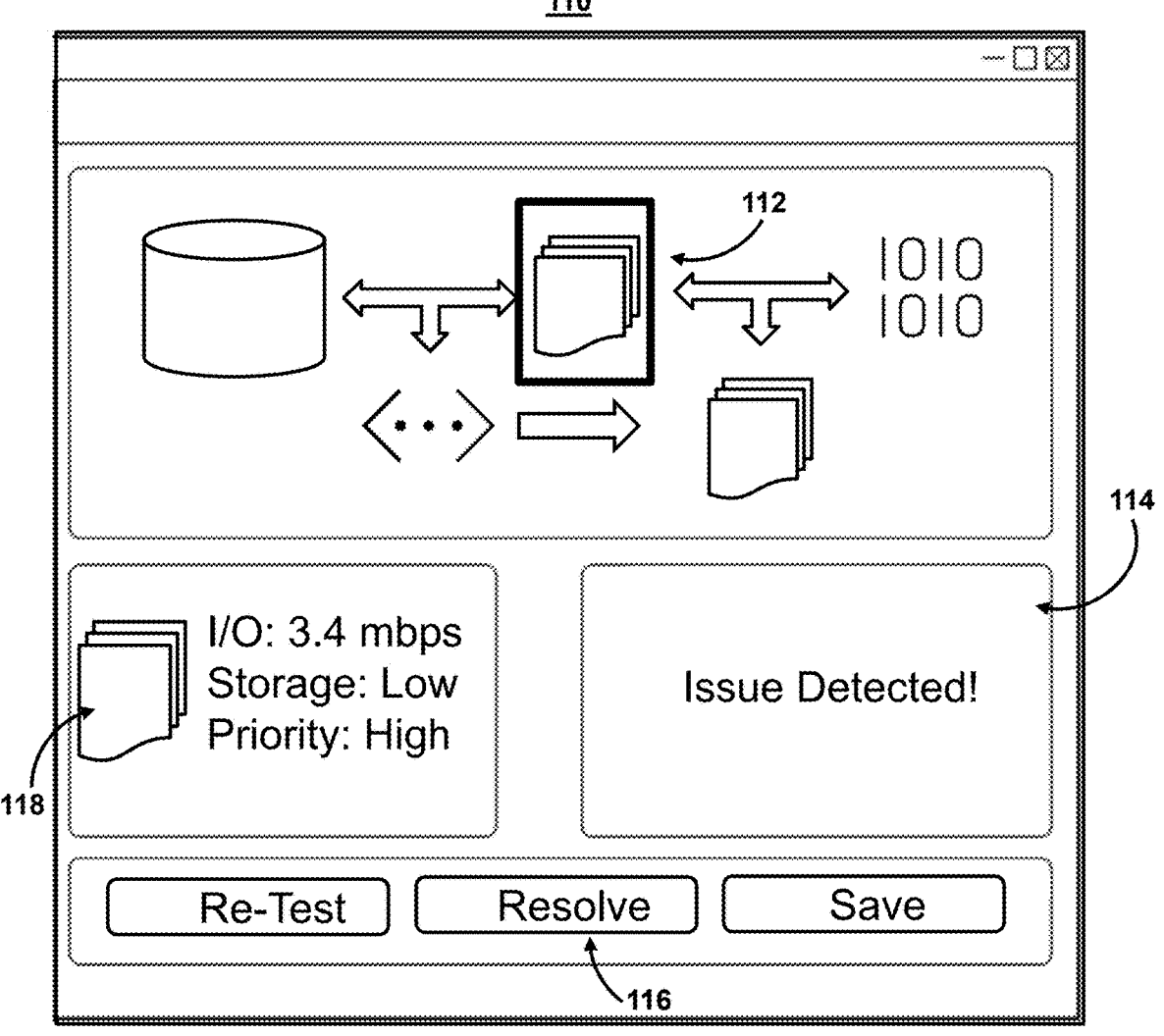

FIG. 1B shows an illustrative user interface displaying a selection of one or more components in a software applications lineage log, in accordance with one or more embodiments. For example, user interface 110 (which in some embodiments may correspond to user interface 100 (FIG. 1A) after selection of icon 106 (FIG. 1A)) shows component 112 being highlighted and/or otherwise graphically distinguished. For example, the system may have detected that there is an issue with component 112 based on event data received from component 112 during one or more processes. As shown, user interface 110 may provide details (e.g., details 118) related to a notification (e.g., notification 114) about an issue. Additionally, user interface 110 may provide a plurality of options (e.g., option 116) related to the issue. For example, option 116 may instruct the system to provide a recommendation for resolving the issue.

In some embodiments, the system graphically distinguishes component 112 by applying visual indicators that highlight its status within the user interface. These indicators may include changes in color, shading, or borders to make the component stand out from surrounding elements. For instance, the system may outline component 112 with a bold or colored border, fill it with a distinct background color, or apply a semi-transparent overlay to indicate an issue. Additionally, graphical markers such as warning icons, exclamation points, or other symbols may be displayed adjacent to or directly on component 112 to draw attention to the detected issue. In some embodiments, the system may incorporate animations, such as pulsing effects or subtle blinking, to further emphasize the component's status. When a user hovers over or selects component 112, a tooltip or pop-up may appear, providing additional contextual information about the detected issue. These visual enhancements ensure that users can quickly identify and address problematic components within the software applications lineage log.

In some embodiments, the system provides details related to a notification about an issue by displaying relevant information within user interface 110 in a structured and easily accessible manner. When an issue is detected, the system generates a notification, such as notification 114, and presents details 118 that describe the nature of the issue, including its severity, source, and any relevant diagnostic data. These details may appear in a dedicated panel, tooltip, or pop-up window within the interface, ensuring they are readily visible to the user. Additionally, user interface 110 offers a plurality of options, such as option 116, to assist the user in addressing the issue. These options may include actions such as requesting a system-generated recommendation, initiating an automated resolution process, viewing historical data related to the issue, or manually adjusting system parameters. By integrating these details and options within the interface, the system enables users to quickly assess the problem and take appropriate corrective actions.

Figure 1C:
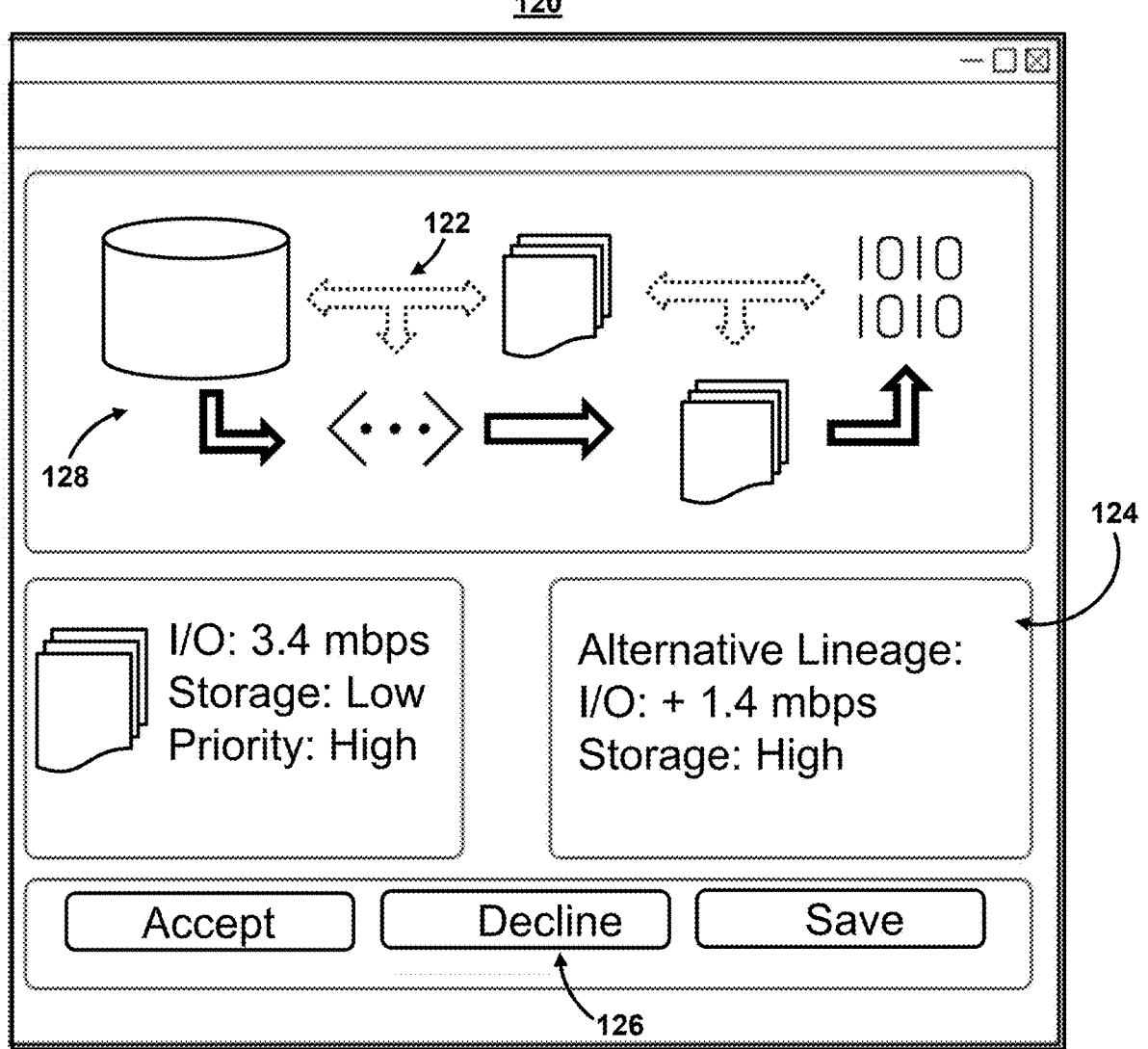

FIG. 1C shows an illustrative user interface displaying a selection of one or more components in a software applications lineage log, in accordance with one or more embodiments. For example, the system may retrieve a first software applications lineage log (e.g., as shown in visualization 102 (FIG. 1A)), wherein the first software applications lineage log comprises a log of event data of a first process being performed by one or more components in a first software system, and wherein the event data is stored in the log in a time-stamped, serial format. For example, the software applications lineage log may be a structured record that captures the sequence of events occurring within a software system, providing a comprehensive history of processes executed by its components. The first software applications lineage log specifically consists of a log of event data related to a first process being performed by one or more components within a first software system. This event data is systematically stored in a time-stamped, serial format, ensuring that each recorded event reflects the precise order in which it occurred. By maintaining a chronological record, the lineage log enables accurate tracking, analysis, and debugging of system activities. It serves as a critical tool for monitoring system performance, diagnosing issues, and tracing dependencies between different components and processes. The structured format of the lineage log allows for efficient querying and retrieval of historical data, facilitating audit trails, compliance reporting, and predictive analysis within the software system.

Upon performing a test, the system may receive first event data corresponding to the first process, wherein the first event data is generated by the one or more components when performing the first process, wherein the first event data comprises a first subset of data that is output by a first component of the one or more components to a second component of the one or more components, and wherein the first event data comprises a second subset of data that is monitored by a third component that is not one of the one or more components. For example, the system receives first event data corresponding to the first process by capturing and collecting data generated by the one or more components as they execute the process. This event data is produced during the operation of the components and includes multiple subsets of information that document interactions and system behavior. Specifically, the first event data comprises a first subset of data that is output by a first component to a second component within the software system. This subset represents direct communication or data exchange between the components, such as function calls, data transfers, or response messages. Additionally, the first event data includes a second subset of data that is monitored by a third component, which is external to the primary set of components executing the process. This third component may serve as an observer, logging relevant operational metrics, performance data, or anomalies without directly participating in the process. By aggregating both subsets of data, the system constructs a comprehensive record of the process, enabling detailed analysis, troubleshooting, and optimization of the software system's functionality.

For example, user interface 120 shows a recommended modification to one or more software applications lineage logs and/or components, applications, processes, and/or code therein). For example, based on the event data, the system has generated a recommendation to modify a portion of an original software applications lineage log (e.g., modification 122) and replace it with a different modification (e.g., modification 128). User interface 120 also provides details (e.g., details 124) indicating one or more results and/or effects of the modifications as well as options (e.g., option 126) for implementing the modification.

For example, the system generates user interface 120 to display a recommended modification to one or more software applications' lineage logs and/or their associated components, applications, processes, or code. Using the event data collected from system activity—such as a first subset of data output by a first component to a second component and a second subset of data monitored by a third, external component—the system analyzes patterns, detects inefficiencies, and identifies potential improvements. Based on this analysis, the system generates a recommendation to modify a portion of the original software applications lineage log. For instance, it may suggest replacing an existing modification, such as modification 122, with a different modification, such as modification 128, to optimize performance, resolve detected issues, or enhance system functionality. User interface 120 presents these recommendations in a structured format, providing details, such as details 124, that explain the expected results and effects of the suggested modifications. Additionally, the interface offers actionable options, such as option 126, allowing the user to implement the recommended modifications, revert changes, or further refine the recommendations. By integrating these elements, user interface 120 facilitates informed decision-making and efficient system improvements.

For example, the recommendations for modifications would differ based on whether they pertain to the software applications lineage logs, components, applications, processes, or code, as each aspect serves a distinct function within the system. For lineage logs, recommendations might focus on improving data accuracy, restructuring event records for better traceability, or optimizing storage formats for faster retrieval. If modifications involve components, the system may suggest enhancements such as upgrading a component, adjusting communication protocols, or optimizing resource allocation to improve performance and reliability. For applications, recommendations could include updating configurations, integrating new functionalities, or refactoring code to enhance scalability and efficiency. In the case of processes, the system might propose workflow adjustments, automation improvements, or error-handling enhancements to streamline execution and reduce failures. When dealing with code modifications, the recommendations could involve refactoring inefficient logic, fixing security vulnerabilities, or implementing best practices to improve maintainability and performance. Each recommendation is tailored to the specific aspect of the software system being analyzed, ensuring that the suggested modifications enhance overall functionality while addressing detected inefficiencies or issues.

In some embodiments, the system may provide a range of advanced analytical tools and insights to enhance the diagnosis and resolution of software issues. One such feature is Dynamic Root Cause Analysis, which automates the examination of system failure and outage logs to determine the root cause of an issue. For example, the system may detect an error and analyze the software application lineage log to determine the most likely cause, or it may categorize the error type and correlate it with specific components within the log to identify failure points.

Another key feature is the Real-Time Health Check, which allows the system to retrieve live health information from all upstream and downstream services connected to a selected application. This enables continuous monitoring by comparing current output with expected output to identify discrepancies before they escalate into critical failures.

To assess the broader impact of failures, the system may generate a Dependency Impact Radius Score, which quantifies the cascading risks associated with interconnected services. This score is determined by analyzing multiple software application lineage logs, identifying dependencies, and predicting additional errors that may propagate due to a failure in a primary system. By determining related lineage logs and assessing potential disruptions, the system can proactively highlight vulnerabilities.

For enhanced visibility, Visual Disruption Indicators can be integrated into the user interface, visually isolating error-ridden applications and emphasizing disruptive services through graphical markers such as color coding, warnings, or flashing alerts. Additionally, Impact Radius Score Analysis provides an in-depth review of system-wide effects, helping users prioritize and mitigate risks. Over time, Historical Impact Scoring enables organizations to track changes in Impact Radius Scores using time-series data, allowing them to monitor how system stability evolves as applications mature or undergo modifications across different environments. This long-term perspective aids in evaluating the effectiveness of past changes and anticipating future risks. Finally, the system supports Custom Reporting, which enables users to export reports tailored to various business needs, including application identifier, application name, Line of Business (LOB), and application type. These reports provide critical insights for stakeholders, allowing them to assess application performance and risk across different operational views. By integrating these capabilities, the recommendation system offers a comprehensive approach to proactive monitoring, troubleshooting, and optimization of software applications.

In some embodiments, the recommendation might provide various elements to support informed decision-making and effective implementation of modifications. These elements could include a detailed description of the suggested modification, explaining what change is needed and why it is beneficial. Additionally, the recommendation may include justification based on event data, outlining how the system identified inefficiencies, errors, or opportunities for improvement through collected logs and monitoring.

The system might also provide impact analysis, detailing potential effects on performance, security, and system dependencies. For example, it could indicate whether the modification will improve processing speed, reduce errors, or affect compatibility with other components. Additionally, alternative solutions may be suggested, giving users multiple options to address the issue, along with a comparison of trade-offs between different approaches. Furthermore, the recommendation may include implementation steps, outlining a clear process for making the change, whether manually or through an automated system update. If the modification involves changes to code, the system could provide code snippets or patches to simplify the update process. For modifications related to processes or workflows, the system may suggest workflow diagrams or procedural changes to optimize efficiency.

Lastly, the recommendation may provide reversal or rollback options, allowing users to restore the previous state if the modification leads to unintended consequences. This ensures flexibility and risk mitigation while implementing changes. By incorporating these elements, the recommendation helps users make well-informed, data-driven decisions that enhance system performance and reliability.

For example, the system may provide a comprehensive suite of features designed to detect, diagnose, and mitigate software issues efficiently. Detection capabilities allow the system to identify issues based on any kind of errors without requiring prior onboarding or pre-configuration of rules. The system dynamically detects problems using various elements such as user session IDs, user identification ID, System Identifiers, and Business Transactions, ensuring a broad and flexible detection mechanism. Once an issue is identified, Causal Anomaly Triage enables not only detection but also an in-depth analysis by tracing logs and providing insights into the root cause of anomalies. This triage process allows users to pinpoint the exact source of disruptions.

Following detection, the system offers Postmortem Analysis, automatically generating detailed postmortem reports that document the issue, its impact, and potential resolutions. These reports help in refining system reliability and preventing future occurrences. Additionally, Self-Healing capabilities provide automated recommendations for solutions, reducing manual intervention and expediting the resolution process. The system also employs Predictive Failure Detection, leveraging historical data and AI-driven insights to anticipate failures before they occur, allowing for preemptive corrective actions.

To maintain ongoing stability, the system includes Monitoring and Alerts, ensuring real-time tracking of performance metrics and instant notifications when anomalies are detected. The Blast Radius Analysis provides an understanding of an issue's Impact Radius over time, detailing how failures propagate across services. The Dependency Impact Radius Score further refines this assessment by calculating the cascading risk of interconnected systems, helping prioritize issue resolution based on potential downstream effects.

For enhanced visibility, Visual Disruption Indicators highlight error-ridden applications and visually isolate disruptive services, making it easier for users to identify critical failures. Impact Radius Score Analysis offers a quantified measure of disruption severity, helping teams prioritize fixes effectively. Over time, Historical Impact Scoring allows organizations to track changes in impact scores through time-series data, providing insights into how applications evolve, stabilize, or degrade over multiple development cycles and environments.

To facilitate data-driven decision-making, the system supports Custom Reporting, enabling the export of insights across multiple perspectives, including application identifier, application name, Line of Business (LOB), and application type. These reports provide a structured and comprehensive overview of system health by aiding technical teams and stakeholders in strategic planning and operational improvements. By integrating these features, the recommendation system delivers a robust, end-to-end solution for software reliability, resilience, and proactive issue resolution.

Figure 2:
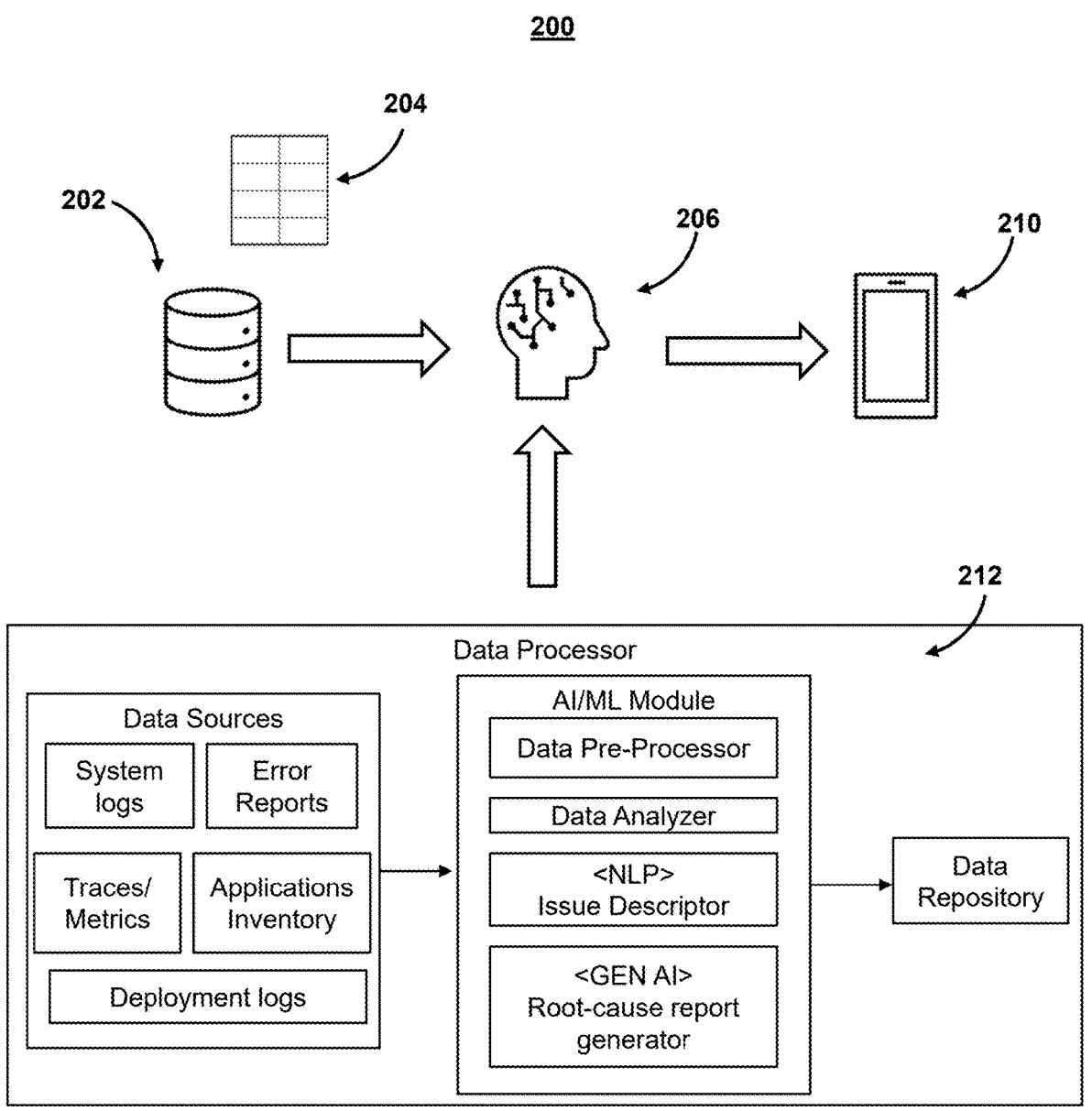
FIG. 2 shows an illustrative diagram for a system for mapping dependencies across system components, in accordance with one or more embodiments.

FIG. 2 shows an illustrative diagram for a system for mapping dependencies across system components, in accordance with one or more embodiments. For example, system 200 may use a plurality of events detailed in software applications lineage logs (e.g., software applications lineage log 204) to create, using an artificial intelligence model (e.g., model 206), a network mapping of how system components are arranged and interact (e.g., a configuration of subset of components in a software system(s)).

For example, system 200 may receive (e.g., via user interface 210) a first user request to generate a first visualization (e.g., on user interface 210) of a first configuration of a first subset of components in a first software system. The first visualization may comprise a hierarchical workflow mapping of the first subset of components. For example, a user may request system 200 generate a visualization as shown in FIGS. 1A-1C that includes a hierarchical workflow mapping and/or upstream and downstream connections of the first subset of components when processing user requests.

In response to the first user request, system 200 may retrieve a first software applications lineage log (e.g., software applications lineage log 204) from storage 202. The first software applications lineage log may comprise a log of event data of current processes being performed in the first software system. Additionally, the log of event data may comprise a plurality of characteristics for each event in the event data, wherein the plurality of characteristics includes a time stamp, component identifier, and/or process identifier.

For example, a time stamp for an event may indicate when an event occurred. A component identifier for an event may indicate what component generated the event. A process identifier may indicate a process that generated the event.

Storage 202 may store the software applications lineage log for each process and/or event generated from the software system. For example, storage 202 may store historical software applications lineage logs that indicate respective time stamps, event names, components, or other data for known software system configurations performing known processes. For example, system 200 may store historical software applications lineage logs by capturing and recording detailed information about events and their contexts, ensuring that all relevant aspects of network configurations and processes are preserved. Each log entry may include a timestamp to record the precise time an event occurred, an event name to describe the nature of the activity, identifiers for the involved components, and/or additional metadata related to the event and the network configuration. This information is structured in a consistent format, such as JSON, XML, or a relational database schema, allowing for uniformity and ease of access.

For example, system 200 may archive event data by systematically capturing and recording each event's details, including timestamps, event names, components, and other relevant data, as they occur within known software system configurations performing specific processes. When an event is triggered, the system generates a log entry that includes a precise timestamp, ensuring an accurate record of when the event took place. The event name provides a clear description of the action or occurrence, while component identifiers indicate which parts of the network were involved. Additional metadata may include user IDs, process identifiers, data states before and after the event, and any relevant contextual information.

Once captured, the logs are stored in a centralized and secure repository (e.g., storage 202). In some embodiments, storage 202 may be a relational database, a NoSQL database, or a distributed file system, depending on the volume and nature of the data. To facilitate efficient storage and retrieval, system 200 may employ indexing and tagging mechanisms, which organize the logs based on key attributes such as timestamps, event types, and component identifiers. To ensure data integrity and security, system 200 may use encryption to protect sensitive information and implements access control policies to restrict who can view or modify the logs.

System 200 may generate training data (which may be stored in storage 202) based on the historical software applications lineage logs. System 200 may generate training data based on historical software applications lineage logs by systematically extracting and labeling event data from these logs, which contain detailed records of known component configurations performing known processes. For example, system 200 may aggregate the historical software applications lineage logs, ensuring that all events, including timestamps, event names, component identifiers, and other relevant metadata, are collected. Each log entry may already be associated with specific configurations and processes, providing a rich source of labeled data.

System 200 may then preprocess the logs to clean and normalize the data, removing any inconsistencies, duplicates, or irrelevant entries. This may involve parsing the log entries to extract key attributes and transforming them into a standardized format suitable for machine learning. For example, timestamps might be converted into numerical formats, event names categorized, and component identifiers encoded. System 200 may then label the data by associating each log entry with its corresponding configuration and/or process. This labeling may be guided by the metadata within the logs, ensuring that each entry is correctly matched with the known configuration and process it pertains to. These labeled entries are then organized into structured datasets, where each row represents an individual event with its associated features and labels.

System 200 may also perform feature engineering to create new features from the existing data, enhancing the predictive power of the training dataset. This could include deriving metrics such as event frequencies, durations, or patterns of component interactions. The final training dataset is then split into training, validation, and test sets to ensure robust model development and evaluation.

By leveraging historical software applications lineage logs in this manner, the system creates comprehensive and accurately labeled training datasets that reflect real-world network behaviors and configurations. These datasets can then be used to train machine learning models for various purposes, such as detecting known configurations of a software system based on the event data in a software applications lineage log. For example, system 200 may determine that the historical software applications lineage log for a given known configuration of components is similar to that of a current software applications lineage log. Based on the similarity, system 200 may determine that the current software system has the known configuration.

For example, system 200 may capture a real-time software applications lineage log of the current network configuration as it executes a targeted process. This log may include detailed records such as timestamps, event names, component identifiers, and other relevant metadata that describe the behavior and interactions of the network components during the process. The system then retrieves historical software applications lineage logs that document known configurations performing the same process. These historical logs may serve as reference points, containing well-documented configurations and their corresponding behaviors during the execution of the process. The system uses these logs to create a baseline or template of what the process should look like when performed by different known configurations.

To compare the current software applications lineage log with the historical logs, system 200 employs various analytical techniques. It starts by aligning the events in the current log with those in the historical logs, ensuring that the sequence and timing of events are comparable. Key metrics such as event frequencies, durations, and the specific components involved are analyzed. System 200 may also look for patterns and anomalies by examining the similarities and differences between the current and historical logs.

In some embodiments, system 200 may use pattern recognition techniques to enhance the comparison process. These algorithms can detect subtle differences and identify deviations that might not be immediately obvious. For instance, if the current configuration exhibits a delay in certain events or involves additional components not present in the historical logs, these discrepancies may indicate a new configuration, component, etc.

Based on the comparison results, the system can infer the current configuration by identifying which known configuration most closely matches the current log's characteristics. If the current configuration does not match any known configuration, the system may either classify it as a new configuration or highlight specific differences for further investigation. This comparison process enables the system to accurately identify and understand the current network configuration, facilitating effective monitoring, troubleshooting, and optimization of the network's performance.

System 200 may then generate for display, on user interface 210, the first visualization based on the first output, wherein the first visualization comprises a first mapping of the first configuration (e.g., visualization 102 (FIG. 1A)). System 200 may then receive a second user request to perform a test a first component in the first subset of components as shown in the first visualization. System 200 may then determine a child component for the first component based on the first visualization. The system may then generate a result to the test based on an effect on the child component.

For example, after determining a mapping of a network configuration, a system determines the effect of a downstream component by analyzing the dependencies and data flow between interconnected components within the network. Once the configuration mapping is established, which details how each component is connected and interacts, the system may identify the downstream components relative to a particular upstream component or event.

System 200 may begin by tracing the data paths and communication channels from the source component through the network, mapping out the sequence of components that the data or signal traverses. This involves examining the software applications lineage logs, which provide records of data flows, transformations, and interactions across the network. By understanding these pathways, the system can identify which components are downstream and how they are affected by changes or events in upstream components.

To determine the specific effects on downstream components, system 200 performs a detailed analysis of the data dependencies and interaction patterns. This includes assessing how data transformations, delays, errors, or performance variations in the upstream component propagate through the network. For instance, if an upstream server experiences a performance bottleneck, the system analyzes how this impacts the data processing times and throughput in downstream servers, applications, or databases.

Advanced analytical techniques, such as impact analysis and dependency graphs, are used to quantify and visualize these effects. System 200 might simulate different scenarios to predict how changes in the upstream component will ripple through the network, affecting performance, reliability, and data integrity in downstream components. Machine learning models trained on historical data can also be utilized to predict the likely impacts based on past occurrences and patterns. Additionally, the system monitors real-time metrics and logs to detect immediate effects on downstream components, such as increased latency, error rates, or reduced performance. Alerts and notifications can be generated to inform network administrators of any adverse impacts, allowing for timely intervention and mitigation. By systematically analyzing the relationships and dependencies within the network configuration, the system can accurately determine the effects on downstream components, providing valuable insights for maintaining network performance, troubleshooting issues, and optimizing overall network operations. The system may then make recommendations related to the effects.

Model 206 may comprise multiple sub-components as implemented on one or more data processors. For example, data processor 212 may use a configuration in which data sources are fed into an AI module that process data and/or stored the data in a data repository for later user. The data sources may include system logs, error reports, traces/ metrics, applications on inventory, and/or deployment logs. The AI module may include a data pre-processor, data analyzer, NLP issue descriptor, and/or a Gen AI that includes a root-cause report generator. The system utilizes a model, such as model 206, which comprises multiple sub-components implemented on one or more data processors to analyze and process data effectively. For example, data processor 212 may be configured to receive and manage various data sources that feed into an AI module. These data sources may include system logs, error reports, traces and metrics, applications inventory, and deployment logs, providing a comprehensive dataset for monitoring and diagnosing system behavior. Within the AI module, several specialized components work together to process and analyze the incoming data. A data pre-processor ensures that raw data is cleaned, structured, and formatted for further analysis. The data analyzer then examines patterns, anomalies, and correlations within the data to identify potential issues or inefficiencies. Additionally, an NLP issue descriptor utilizes natural language processing techniques to interpret and categorize detected issues, translating complex technical logs into human-readable descriptions. A Generative AI (Gen AI) module further enhances the system by including a root-cause report generator, which synthesizes findings into a structured diagnostic report. This report provides insights into the underlying cause of detected issues, helping users understand and resolve them efficiently. By integrating these components, the system ensures a streamlined and intelligent approach to real-time issue detection, root cause analysis, and system optimization.

Figure 3A:
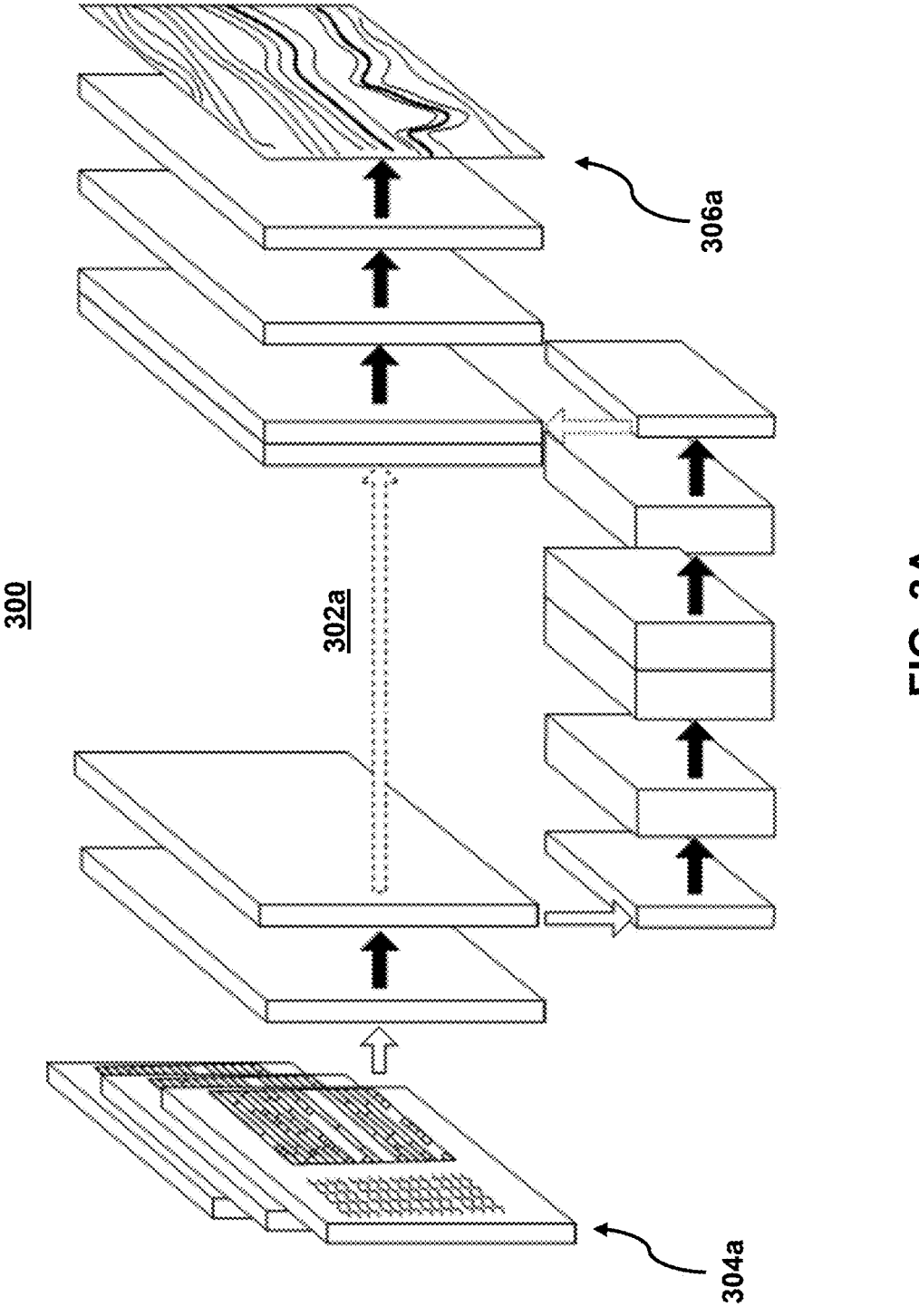
FIGS. 3A-3B show illustrative components for a system used to generate a mapping of dependencies across system components in a distributed architecture, in accordance with one or more embodiments.
Figure 3B:
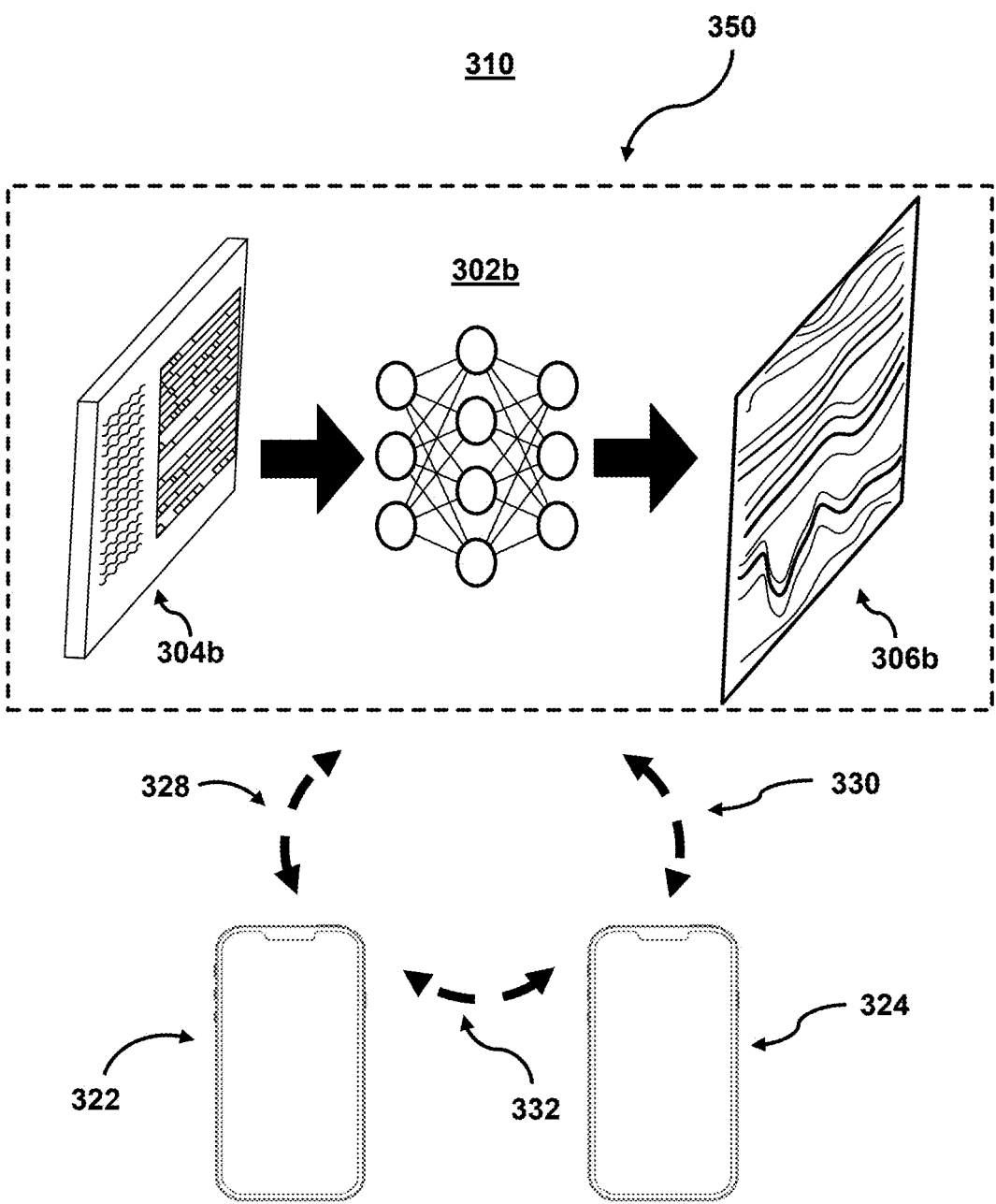

FIGS. 3A-3B show illustrative components for a system used to generate a mapping of dependencies across system components in a distributed architecture, in accordance with one or more embodiments. For example, FIG. 3A may represent a model architecture used to determine configurations based on software applications lineage logs.

System 300 also includes model 302a, which may be a machine learning model, artificial intelligence model, etc. (which may be referred collectively as "models" herein). Model 302a may take inputs 304a and provide outputs 306a. The inputs may include multiple datasets, such as a training dataset and a test dataset. Each of the plurality of datasets (e.g., inputs 304a) may include data subsets related to user data, predicted forecasts and/or errors, and/or actual forecasts and/or errors. In some embodiments, outputs 306a may be fed back to model 302a as input to train model 302 (e.g., alone or in conjunction with user indications of the accuracy of outputs 306a, labels associated with the inputs, or with other reference feedback information). For example, the system may receive a first labeled feature input, wherein the first labeled feature input is labeled with a known prediction for the first labeled feature input. The system may then train the first model to classify the first labeled feature input with the known prediction (e.g., a configuration, an effect on an upstream and/or downstream component, recommendations for components, etc.).

For example, as described herein, system 300 may train, using training data based on historical software applications lineage logs that indicate respective time stamps, event names, components, or other data for known software system configurations performing known processes, a model to generate outputs comprises predicted software system configurations based on inputs of current software applications lineage logs. In some embodiments, during the training phase, system 300 employs machine learning algorithms, such as decision trees (e.g., a tree component classifier), random forests, and/or neural networks, to learn the relationships between the input features (e.g., timestamps, event names, components) and the target labels (known network configurations). The model iteratively adjusts its parameters to minimize prediction errors, using techniques like gradient descent and backpropagation for neural networks.

The model is trained to recognize patterns and correlations in the historical data that indicate specific network configurations. By learning these patterns, the model becomes capable of making predictions about the network configuration based on new, current software applications lineage logs. The validation set is used to fine-tune the model, ensuring it generalizes well to new data and does not overfit the training data. Once the model is trained and validated, it is tested on the test set to assess its accuracy and reliability. The final model can then be deployed to generate outputs comprising predicted software system configurations when provided with inputs of current software applications lineage logs. As the system receives new data over time, it can continuously update and retrain the model, incorporating fresh information to maintain accuracy and adapt to changes in the network's behavior and configurations. By leveraging historical software applications lineage logs, the system effectively trains a model that can predict current network configurations, enabling proactive monitoring, troubleshooting, and optimization of the network's performance based on real-time data inputs. For example, system 300 may generate a first feature input based on the first software applications lineage log. System 300 may then input the first feature input into a first artificial intelligence model to generate a first output, wherein the first artificial intelligence model is a tree component classifier.

In a variety of embodiments, model 302a may update its configurations (e.g., weights, biases, or other parameters) based on the assessment of its prediction (e.g., outputs 306a) and reference feedback information (e.g., user indication of accuracy, reference labels, or other information). In a variety of embodiments, where model 302a is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302a may be trained to generate better predictions.

In some embodiments, the model (e.g., model 302a) may automatically perform actions based on outputs 306. In some embodiments, the model (e.g., model 302a) may not perform any actions. The output of the model (e.g., model 302a) may be used to predict a configuration, an effect on an upstream and/or downstream component, recommendations for components, etc.

FIG. 3B shows illustrative components for a system used to generate a mapping of dependencies across system components in a distributed architecture, in accordance with one or more embodiments. For example, FIG. 3B may show illustrative components for determining configurations based on software applications lineage logs. As shown in FIG. 3B, system 310 may include mobile device 322 and mobile device 324. While shown as smartphones in FIG. 3, it should be noted that mobile device 322 and mobile device 324 may be any computing device, including, but not limited to, a laptop computer, a tablet computer, a hand-held computer, and other computer equipment (e.g., a server), including "smart," wireless, wearable, and/or mobile devices. System 300 may also include cloud components. For example, cloud components may be implemented as a cloud computing system and may feature one or more component devices. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by cloud components. In some embodiments, the various computers and systems described herein may include one or more computing devices that are programmed to perform the described functions. Additionally, or alternatively, multiple users may interact with system 300 and/or one or more components of system 300.

With respect to the components of mobile device 322 and mobile device 324, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and mobile device 324 include a display upon which to display data.

Additionally, as mobile device 322 and mobile device 324 are shown as touchscreen smartphones, these displays also act as user input interfaces. It should be noted that in some embodiments, the devices may have neither user input interfaces nor displays and may instead receive and display content using another device (e.g., a dedicated display device such as a computer screen, and/or a dedicated input device such as a remote control, mouse, voice input, etc.). Additionally, the devices in system 300 may run an application (or another suitable program).

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3B also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

System 310 also includes API layer 350. API layer 350 may allow the system to generate summaries across different devices. In some embodiments, API layer 350 may be implemented on mobile device 322 or mobile device 324. Alternatively or additionally, API layer 350 may reside on one or more of cloud components. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDoS protection, and API layer 350 may use RESTful APIs as standard for external integration.

As shown in FIG. 3B, in some embodiments, model 302b may be trained by taking inputs 304b and provide outputs 306b. Model 302b may include an artificial neural network. In such embodiments, model 302b may include an input layer and one or more hidden layers. Each neural unit of model 302b may be connected with many other neural units of model 302b. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302b may be self-learning and trained, rather than explicitly programmed, and can perform significantly better in certain areas of problem solving, as compared to traditional computer programs. During training, an output layer of model 302 may correspond to a classification of model 302b, and an input known to correspond to that classification may be input into an input layer of model 302b during training. During testing, an input without a known classification may be input into the input layer, and a determined classification may be output.

In some embodiments, model 302b may include multiple layers (e.g., where a signal path traverses from front layers to back layers). In some embodiments, back propagation techniques may be utilized by model 302b where forward stimulation is used to reset weights on the "front" neural units. In some embodiments, stimulation and inhibition for model 302 may be more free-flowing, with connections interacting in a more chaotic and complex fashion. During testing, an output layer of model 302b may indicate whether or not a given input corresponds to a classification of model 302b (e.g., a configuration, an effect on an upstream and/or downstream component, recommendations for components, etc.).

Model 302b is shown as a convolutional neural network. A convolutional neural network consists of an input layer (e.g., input 304a), hidden layers, and an output layer (e.g., output 306b). As shown in FIG. 3B, the middle layers are called hidden because their inputs and outputs are masked by the activation function and final convolution. In a convolutional neural network, the hidden layers include layers that perform convolutions. Model 302b may comprise convolutional layers that convolve the input and pass its result to the next layer. Model 302b includes local and/or global pooling layers along with traditional convolutional layers. Pooling layers reduce the dimensions of data by combining the outputs of neuron clusters at one layer into a single neuron in the next layer. Also as shown, model 302b may comprise fully connected layers that connect every neuron in one layer to every neuron in another layer.

Figure 4:
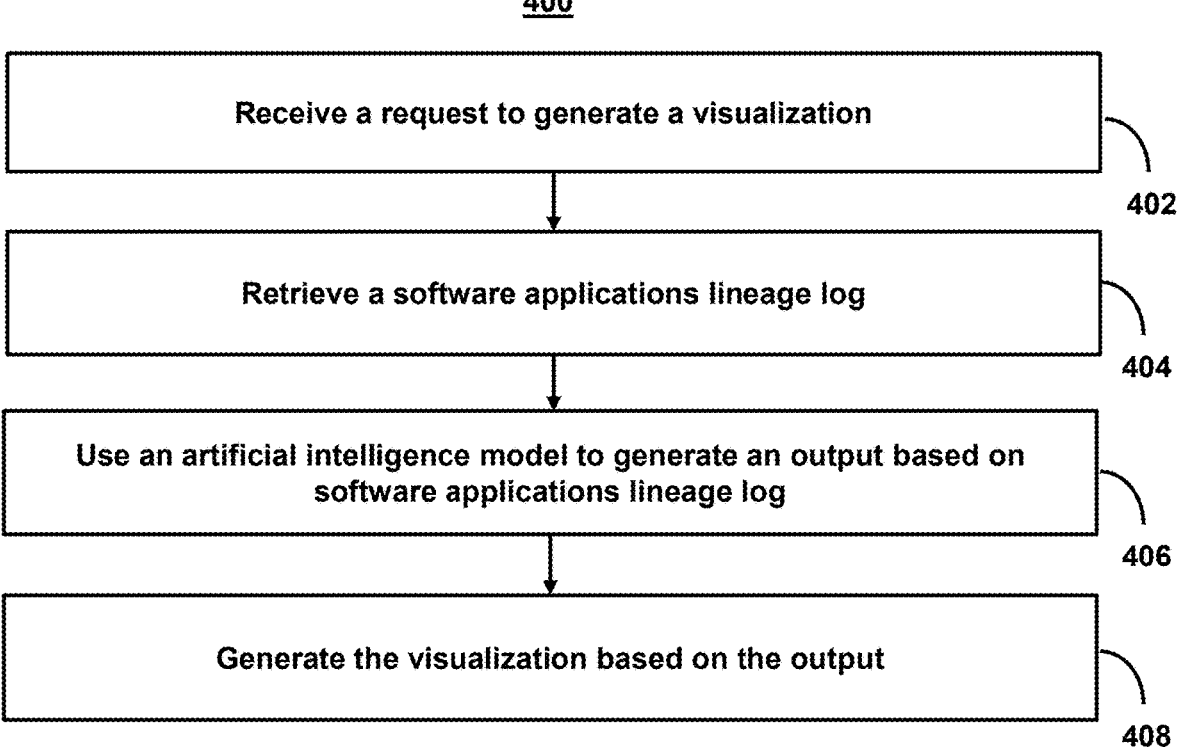
FIG. 4 shows a flowchart of the steps involved in real-time mapping and visualization generation of system components, in accordance with one or more embodiments.

FIG. 4 shows a flowchart of the steps involved in real-time mapping and visualization generation of system components, in accordance with one or more embodiments. For example, the system may use process 400 (e.g., as implemented on one or more system components described above) in order to provide real-time mapping and visualization generation of system components.

At step 402, process 400 (e.g., using one or more components described above) receives a request to generate a visualization. For example, the system may receive a first user request to generate a first visualization of a first configuration of a first subset of components in a first software system.

At step 404, process 400 (e.g., using one or more components described above) retrieves a software applications lineage log. For example, the system may, in response to the first user request, retrieve a first software applications lineage log (e.g., from storage), wherein the first software applications lineage log comprises a log of event data of current processes being performed in the first software system.

At step 406, process 400 (e.g., using one or more components described above) uses an artificial intelligence model to generate an output based on software applications lineage log. In some embodiments, the artificial intelligence model may be trained using training data. For example, the system may train a tree component classifier to classify nodes into component types and train the tree component classifier to identify edges between the nodes. The system may train a tree component classifier to classify nodes into component types and identify edges between nodes through a structured training process involving labeled data, feature extraction, and model training. To do so, the system collects a comprehensive dataset of network configurations, where each configuration includes detailed information about the nodes (components) and their interconnections (edges). This dataset is labeled, meaning that each node is annotated with its corresponding component type (e.g., server, router, switch) and each edge is annotated with the nature of the relationship or data flow between nodes. The system pre-processes the dataset by extracting relevant features from the nodes and edges. For nodes, features might include attributes such as component identifiers, performance metrics, roles within the network, and other contextual information. For edges, features might encompass connection types, data flow directions, bandwidth usage, latency, and error rates. With the features extracted, the system constructs a training set where each node is represented by its feature vector and labeled with its component type. Similarly, for edges, the training set includes pairs of nodes (or connections) represented by their combined features and labeled with the type of relationship or interaction. The system then trains the tree component classifier, which is typically a decision tree or a more complex ensemble of trees like a random forest. During training, the classifier learns to distinguish between different component types based on the feature vectors of the nodes. It builds decision rules by recursively splitting the feature space to best separate the nodes according to their labels, creating a hierarchical tree structure where each leaf node represents a component type classification. For identifying edges, the system trains the classifier to recognize patterns in the relationships between nodes. This involves learning which features and combinations of features are indicative of specific types of connections. The classifier uses this knowledge to predict the presence and type of edge between any given pair of nodes.

Once trained, the tree component classifier can classify new nodes into their respective component types based on their feature vectors and identify edges between nodes by predicting the types of connections that should exist based on the learned patterns. This enables the system to accurately map out network configurations and understand the relationships between different components, facilitating tasks such as network monitoring, optimization, and troubleshooting.

The system may generate a first feature input based on the first software applications lineage log. In some embodiments, the system generates a feature input based on a software applications lineage log by extracting and transforming relevant information from the log entries into a structured format suitable for models. This process begins with the system parsing the software applications lineage log, which contains detailed records of events, such as timestamps, event names, component identifiers, and other metadata related to the network's activities. The system may then order the event data based on the first time stamp.

In some embodiments, the system may identify the key attributes from the log that are relevant for the specific machine learning task. These attributes might include the time each event occurred, the type of event, the components involved, the duration of processes, data flow quantities, and any error or performance metrics recorded. The system may then clean the data by handling missing values, correcting inconsistencies, and normalizing the data to ensure uniformity.

In some embodiments, the system performs feature engineering to create new, informative features from the raw log data. This might involve aggregating events to capture higher-level trends, such as the frequency of specific event types over a period, or calculating the time intervals between related events to understand process durations. Additionally, the system might derive features that reflect the state of the network, such as the load on particular components or the number of active connections at different times.

Once the relevant features are identified and engineered, the system may organize them into a feature vector for each log entry or a sequence of entries, depending on the nature of the analysis. For example, a feature vector might include the timestamp, the encoded event name, the identifiers of the involved components, the duration of the event, and any other derived metrics. These feature vectors are then normalized and scaled as necessary to ensure compatibility with machine learning algorithms.

The resulting feature inputs are then assembled into a dataset, where each row represents a set of features corresponding to a specific event or time window within the software applications lineage log. This dataset is used to train, validate, and test machine learning models, enabling the system to learn patterns and make predictions based on new software applications lineage logs. By transforming software applications lineage logs into structured feature inputs, the system effectively captures the essential aspects of network events and behaviors, providing a robust foundation for machine learning applications.

The system may then input the first feature input into a first artificial intelligence model to generate a first output. The first artificial intelligence model may be trained by generating first training data based on historical software applications lineage logs that indicate respective time stamps, event names, components, or other data for known software system configurations performing known processes. The system may then train, using the first training data, the first artificial intelligence model to generate outputs comprises predicted software system configurations based on inputs of current software applications lineage logs.

In some embodiments, generating the first output may comprise the system determining a first component in a first hierarchical level in the first configuration and determining a parent component for the first component based on the first feature input indicating that the parent component inputs processing data to the first component in the first configuration. Additionally or alternatively, the system may determine a child component for the first component based on the first feature input indicating that the child component receives processing data from the first component in the first configuration. For example, to determine the first component in a hierarchical level, the model may examine the attributes of the feature input to identify components that perform specific roles or functions within the network. These components are categorized based on their operational characteristics and their position within the data processing hierarchy. The model may use predefined criteria or learned patterns to classify the first component as belonging to the first hierarchical level. Once the first component is identified, the model then seeks to determine its parent/child component. This involves analyzing the feature input to trace back the data flow to the component that supplies processing data to the first component. The feature input provides crucial details about the data sources and destinations, including timestamps, event types, and component identifiers, which the model uses to map the data pathways. By identifying the component that inputs processing data to the first component, the model effectively determines the parent-child relationship between components in the configuration. The parent component is the one that directly influences the operation of the first component by supplying the necessary data for processing, whereas the child component is a dependent component. The model may generate an output that includes the identified first component, its hierarchical level, and its parent/child component. This output provides a clear representation of the network configuration, highlighting the dependencies and data flow paths that define the structure and operation of the network.

In some embodiments, the system may generate the first output by determining a first component in a first hierarchical level in the first configuration and determining a second component in the first hierarchical level in the first configuration based on the first feature input indicating that the first component generates a first event datum within a threshold time of the second component generating a second event datum. For example, to establish a dependency, the system first identifies the occurrence of a first event datum generated by the first component. It then looks for a second event datum generated by the second component within a specified threshold time from the first event. This threshold time is a predefined interval that the system uses to determine temporal proximity, suggesting a potential causal or dependency relationship between the two events. In some embodiments, the system applies a temporal analysis algorithm to compare the timestamps of the events. If the second event datum occurs within the threshold time after the first event datum, the system infers that there is likely a dependency between the two components. This means the operation or state of the second component is influenced by or related to the operation or state of the first component. To ensure accuracy, the system may analyze multiple instances of these events over time. Consistent patterns of the first component's events being followed by the second component's events within the threshold time strengthen the evidence of a dependency. The system might also consider additional contextual information from the software applications lineage logs, such as the nature of the events, data flows, and any error or performance metrics associated with the components.

In some embodiments, the system may generate a first output by determining a first component in a first hierarchical level in the first configuration and determining a second component in the first hierarchical level in the first configuration based on the first feature input indicating that a third component receives processing data from both the first component and the second component. Additionally or alternatively, the system may generate a first output by determining a first component in a first hierarchical level in the first configuration and determining a second component in the first hierarchical level in the first configuration based on the first feature input indicating that a third component transmits processing data to both the first component and the second component. For example, the system may determine a location or hierarchical level of a component by determining that the component receives data from (or transmits data to) other components that have known locations and/or hierarchical levels.

In some embodiments, the system may identify inconsistencies. In response to identifying the inconsistencies the system may perform additional actions. For example, the system may generate a first output by detecting an inconsistency between a determined hierarchical level in the first configuration for a first component in a first hierarchical level in the first configuration and a first event datum for the first component. In response to detecting the inconsistency, the system may query the first software applications lineage log for additional event data and/or query a supplemental data source of potential network configurations of the first software system. For example, the system may identifies inconsistencies in software applications lineage logs by continuously monitoring and analyzing the events and configurations recorded in these logs. The system may parse and structure the software applications lineage logs, ensuring that all events, timestamps, component identifiers, and hierarchical levels are accurately captured and organized. The system may then establish a baseline of expected configurations and behaviors based on historical data and predefined rules. This baseline includes the hierarchical levels of components and their expected interactions and event patterns. For instance, the system may determine that a particular component should generate specific events when operating correctly within its designated hierarchical level. To detect inconsistencies, the system may compare real-time software applications lineage logs against this baseline. It monitors events as they occur and checks if they align with the expected patterns. If the system detects an inconsistency, such as a first event datum for a component that does not match its determined hierarchical level in the current configuration, it flags this as a potential issue. Upon detecting an inconsistency, the system triggers additional actions to further investigate and resolve the issue. One such action is querying the first software applications lineage log for additional event data. This involves a deeper analysis of past events related to the component in question, looking for anomalies, irregularities, or patterns that might explain the inconsistency. Simultaneously, the system may query a supplemental data source containing information about potential network configurations. This supplemental data source provides a broader context and alternative configurations that might be relevant. By comparing the current configuration and events against these potential configurations, the system can identify if the inconsistency is due to a recent change, an unexpected behavior, or a misconfiguration.

The system uses these additional queries and comparisons to generate a first output that details the inconsistency and suggests possible causes and solutions. This output might include a summary of the detected anomaly, the results of the additional queries, and recommendations for corrective actions. The system may then generate for display information based on this output. Network administrators can then use this information to address the inconsistency, ensuring the network operates correctly and efficiently.

At step 408, process 400 (e.g., using one or more components described above) generates the visualization based on the output. For example, the system may generate for display, on a user interface, the first visualization based on the first output, wherein the first visualization comprises a first mapping of the first configuration.

In some embodiments, the system may generate for display, on the user interface, the first visualization by determining a first component in a first hierarchical level in the first configuration and generating a first architecture diagram of a plurality of components in the first visualization, wherein the first component is included in the plurality of components at the first hierarchical level of the first architecture diagram. For example, system may generate the first architecture diagram. This diagram may visually represent the network configuration, with components organized according to their hierarchical levels. The first component may be placed at its appropriate level, and the other components are arranged accordingly to reflect their roles and interactions within the network. The diagram is constructed using graphical elements like nodes for components and edges for the connections between them. The system may use visualization tools and libraries to create the architecture diagram, ensuring it is clear and informative. This may involve selecting suitable shapes, colors, and layouts to distinguish different types of components and hierarchical levels. The connections between components are depicted with arrows or lines, indicating the direction and nature of data flows or dependencies. Once the architecture diagram is generated, the system may integrate it into the user interface for display. This involves embedding the diagram within a user-friendly interface that allows users to interact with and explore the visualization. Users can click on components to view more detailed information, zoom in and out for different levels of detail, and possibly filter or highlight specific aspects of the network. By providing this first visualization on the user interface, the system enables users to gain a clear and structured view of the network configuration. They can easily identify the first component at its hierarchical level and understand its relationship with other components, facilitating tasks such as network management, troubleshooting, and optimization.

In some embodiments, the system may allow a user to perform further actions (e.g., filtering, testing, etc.) based on the visualization. For example, the system may receive a first criterion for filtering one or more components in the first visualization and filter the one or more components in the first visualization based on the first criterion. In another example, the system may receive a first criterion for testing a first component in the first subset of components in the first software system. The system may determine a child component for the first component based on the first configuration and generate a result based on the first criterion, wherein the result indicates an effect of the first criterion on the child component. In yet another example, the system may determine a plurality of dependencies for the first subset of components in the first software system based on the first configuration and store the plurality of dependencies in a centralized repository for the first software system. In yet another example, the system may receive a first criterion for searching for a first component in the first subset of components in the first software system and generate a result based on the first criterion, wherein the result indicates a location of the first component in the first subset of components.

For instance, the system can receive a first criterion for filtering one or more components in the first visualization. This criterion could be based on component type, status, performance metrics, or any other relevant attribute. Upon receiving the filtering criterion, the system dynamically updates the visualization, highlighting or hiding components that meet the specified criterion. This allows users to focus on specific parts of the network, making it easier to identify and address issues or analyze particular aspects of the network configuration. In another example, the system can receive a first criterion for testing a first component within the network. This might involve performance tests, security checks, or functional validations. The system identifies a child component that relies on the first component, based on the hierarchical and dependency mappings from the first configuration. It then applies the testing criterion to the first component and observes the effects on the child component. The results, which indicate the impact of the test on both the first component and its child component, are generated and displayed to the user. This helps in understanding how changes or tests on one part of the network affect other interconnected parts.

Additionally, the system can determine a plurality of dependencies for a subset of components within the network. By analyzing the configuration and the interactions between components, the system identifies and maps out these dependencies. This information is stored in a centralized repository, providing a comprehensive view of how components are interrelated. This repository can be queried to understand the software applications structure better, plan for changes, and ensure that any modifications do not negatively impact dependent components.

The system also supports searching for specific components within the network. A user can input a criterion, such as a component's name, ID, type, or any other identifier. The system searches through the network configuration and the software applications lineage logs to locate the specified component. The result, which includes the component's location and contextual information, is displayed to the user. This functionality helps quickly locate components within large and complex network configurations, facilitating efficient network management and troubleshooting. By providing these interactive features, the system enhances the user's ability to manage and optimize the network. Users can filter views to focus on relevant components, test components and observe downstream effects, analyze dependencies, and quickly locate specific components. This makes the visualization not just a static representation, but a dynamic tool for proactive network management.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

Figure 5:
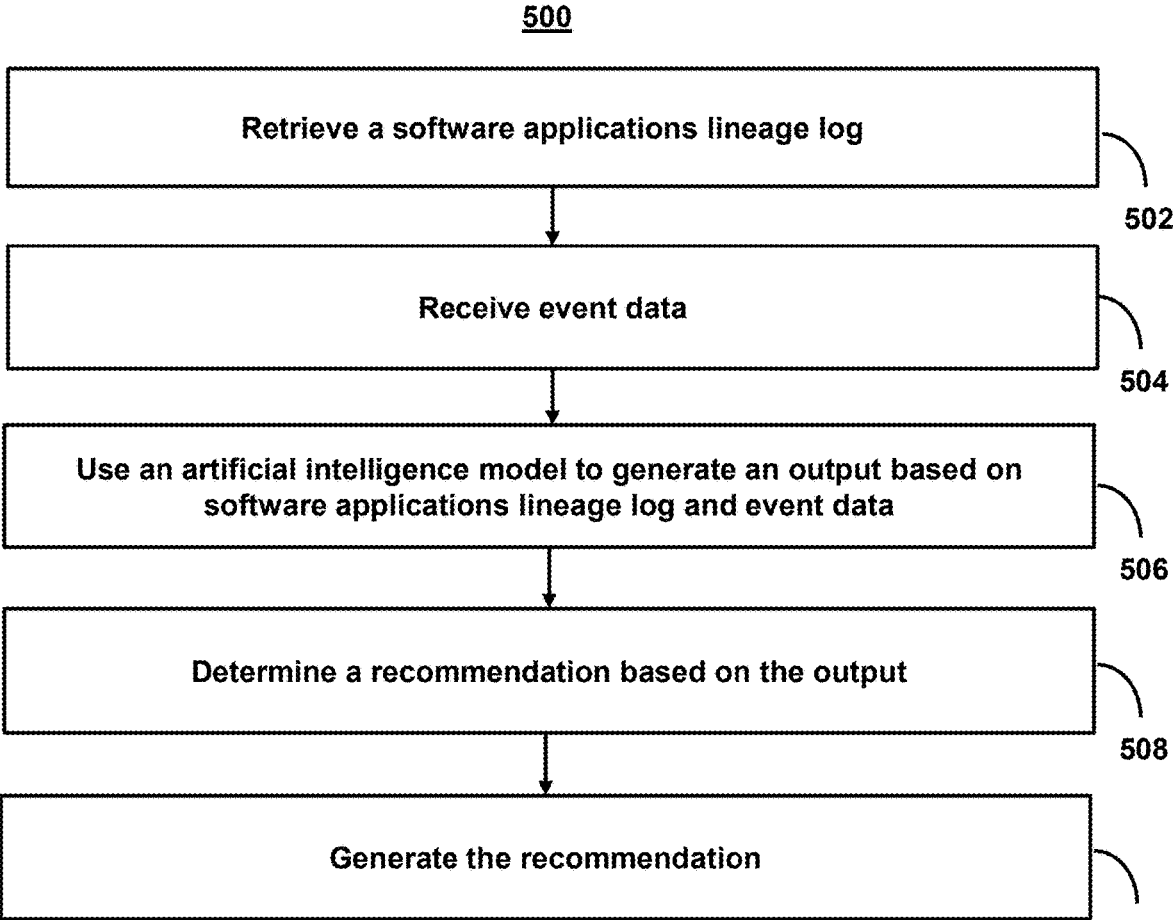
FIG. 5 shows a flowchart of the steps involved in generating recommendations based on real-time mapping of system components in software applications lineage logs, in accordance with one or more embodiments.

FIG. 5 shows a flowchart of the steps involved in generating recommendations based on real-time mapping of system components in software applications lineage logs, in accordance with one or more embodiments. For example, the system may use process 500 (e.g., as implemented on one or more system components described above) in order to provide recommendations and/or modifications related to software applications lineage logs and/or components, applications, processes, and/or code therein).

At step 502, process 500 (e.g., using one or more components described above) retrieves a software applications lineage log. For example, the system may retrieve a first software applications lineage log, wherein the first software applications lineage log comprises a log of event data of a first process being performed by one or more components in a first software system. For example, the system retrieves a first software applications lineage log by accessing stored records of event data that document the execution of a first process by one or more components within a first software system. This retrieval process begins by querying a designated data repository, which may store lineage logs in a structured format such as time-series databases, log files, or distributed storage systems. The lineage log contains a chronological record of event data that captures interactions, dependencies, and changes occurring within the software system during process execution. The system may use indexing, filtering, and search algorithms to efficiently locate and extract relevant log entries based on specific parameters, such as process identifiers, component interactions, timestamps, or error occurrences. Additionally, the system may leverage metadata tagging to categorize and retrieve logs associated with particular applications, transactions, or workflows. Once retrieved, the lineage log can be analyzed to track execution flows, diagnose issues, assess performance, and provide historical context for decision-making. By ensuring seamless access to this structured event data, the system enables comprehensive monitoring, troubleshooting, and optimization of software processes.

At step 504, process 500 (e.g., using one or more components described above) receives event data. For example, the system may receive first event data corresponding to the first process. The system may receive first event data corresponding to the first process by continuously monitoring and capturing data generated by the one or more components executing the process. This data collection occurs in real time or through scheduled intervals, depending on system configurations. The system may use event listeners, log aggregators, or tracing mechanisms to detect and capture key operational metrics, status updates, error messages, and inter-component communications. The first event data may be structured in various formats, including time-stamped logs, structured JSON records, or database entries, ensuring that each event is accurately recorded in the sequence it occurs. The system collects event data from multiple sources, such as system logs, traces, business transactions, error reports, and deployment logs, to build a comprehensive record of process execution. Additionally, the system may use middleware or API-based integrations to capture data as it flows between components, ensuring that all relevant interactions and dependencies are logged. Once received, the event data is stored in a designated repository, where it can be processed, analyzed, and utilized for further diagnostics, reporting, or optimization of the software system.

At step 506, process 500 (e.g., using one or more components described above) uses an artificial intelligence model to generate an output based on the software applications lineage log and event data. For example, the system may generate a first feature input based on the first software applications lineage log and the first event data and input the first feature input into a first artificial intelligence model to generate a first output. The system may generate a first feature input by extracting relevant data from the first software applications lineage log and the first event data, transforming it into a structured format suitable for analysis by a model. This process begins with data preprocessing, where raw event data and lineage log entries are cleaned, normalized, and structured. Key attributes such as timestamps, component interactions, error codes, execution sequences, and system states are identified and selected as feature variables. The system may use feature engineering techniques to derive additional insights, such as aggregating error occurrences, calculating process execution times, detecting anomalies, or identifying dependency patterns between components.

Once the first feature input is generated, the system feeds it into a first AI model, which may be designed for predictive analysis, anomaly detection, or root cause identification. The AI model processes the input using techniques such as machine learning algorithms, deep learning models, or natural language processing (NLP) frameworks, depending on the nature of the data and the analytical goals. The model evaluates patterns, correlations, and potential risks, generating a first output that provides actionable insights. This output could be in the form of error predictions, performance recommendations, dependency impact scores, or suggested modifications to optimize the software system. By leveraging AI-driven analysis, the system enhances its ability to detect, diagnose, and resolve issues efficiently, improving the overall reliability and performance of the software application.

In some embodiments, the system may train the artificial intelligence model by generating first training data based on historical software applications lineage logs that indicate respective time stamps, event names, components, or other data for known software system configurations of the one or more components performing known processes, generating second training data based on historical event data, wherein the historical event data is labeled with the respective time stamps, event names, components, or other data for the known software system configurations of the one or more components performing the known processes, and training, using the first training data and the second training data, the first artificial intelligence model to generate outputs.

For example, the system trains the AI model by generating and utilizing training data derived from historical software application lineage logs and historical event data. First, the system compiles first training data by extracting structured information from historical software application lineage logs, which document past executions of known software system configurations. These logs include respective time-stamps, event names, component interactions, process execution details, and other metadata that provide a comprehensive historical record of system behavior. The system processes this data by organizing it into feature sets, ensuring that it accurately represents system activity and dependencies over time.

Next, the system generates second training data based on historical event data, which contains detailed records of system performance, errors, and execution patterns. This data is labeled with corresponding timestamps, event names, component details, and other contextual information from known system configurations. Labeling enables supervised learning by providing the AI model with reference points for understanding how different system events correlate with specific software configurations and operational conditions.

Using the first training data and second training data, the system proceeds with training the AI model. The training process involves machine learning techniques such as supervised learning, reinforcement learning, or deep learning, depending on the complexity of the model. The AI model learns to recognize patterns, correlations, anomalies, and dependencies between software components, event sequences, and system behaviors. Over multiple iterations, the model refines its ability to predict issues, optimize processes, and generate insightful outputs. This trained AI model is then deployed to analyze new event data in real time, provide root cause analysis, generate performance recommendations, and detect potential failures before they occur. By leveraging historical lineage logs and event data, the system continuously improves its accuracy and effectiveness in monitoring and optimizing software applications.

At step 508, process 500 (e.g., using one or more components described above) determines a recommendation based on the output. For example, the system may determine a first recommendation based on the first output. The system determines a first recommendation based on the first output by analyzing the AI-generated insights and mapping them to actionable solutions. Once the first artificial intelligence model processes the first feature input, it generates a first output that may include predictions, anomaly detections, performance assessments, or dependency risk evaluations. The system then interprets this output by leveraging predefined rules, historical patterns, and contextual factors related to the software applications lineage log and event data.

To generate a meaningful first recommendation, the system evaluates key factors such as the severity of detected issues, potential downstream impact, historical resolution patterns, and best practices for software system optimization. If the AI model identifies a critical error, the system may recommend immediate mitigation actions, such as restarting a failing component, adjusting configurations, or rolling back a faulty deployment. If the output suggests performance inefficiencies, the system may propose code optimizations, resource allocation adjustments, or architectural modifications to enhance efficiency. Additionally, for dependency-related risks, the system could generate a Dependency Impact Radius Score, indicating the level of cascading failures and suggesting targeted intervention points.

The system ensures that the recommendation is context-aware, meaning it considers the current state of the software system, historical resolutions for similar issues, and real-time monitoring data to refine its suggestions. It may also generate alternative recommendations, allowing users to choose the most suitable course of action based on risk assessment and business priorities. Finally, the recommendation is presented in a structured format within the user interface, accompanied by supporting details such as impact analysis, projected outcomes, and implementation options, enabling informed decision-making. By systematically processing the AI output and transforming it into actionable guidance, the system enhances efficiency, reliability, and proactive issue resolution in software applications.

In some embodiments, the system may determine the first recommendation based on the first output by determining, based on the first event data, a first component of the one or more components, determining a first expected component output of the first component when performing the first process, and comparing the first expected component output to the first output. For example, the system determines the first recommendation based on the first output by conducting a structured comparison between the expected and actual performance of a specific component involved in the first process. This process begins by analyzing the first event data to identify the first component of the one or more components responsible for executing the given process. The system then retrieves or generates a first expected component output, which represents the standard or anticipated behavior of the first component when performing the first process under normal conditions. This expected output may be derived from historical data, predefined system rules, machine learning models, or reference performance benchmarks.

Next, the system compares the first expected component output to the first output generated by the AI model. This comparison helps the system determine whether there are deviations, anomalies, performance inefficiencies, or potential failures within the component's execution. If the actual output differs significantly from the expected output, the system conducts further analysis to quantify the discrepancy, identify possible root causes, and assess the severity of the issue.

Based on this evaluation, the system generates the first recommendation, which may suggest corrective actions, optimization strategies, or further diagnostic steps. If the discrepancy indicates a malfunction, the recommendation may include component reconfiguration, software patching, dependency adjustments, or system rollbacks. If the deviation is performance-related, the system may propose resource reallocation, algorithm optimization, or alternative execution pathways. Additionally, the recommendation may include risk assessment metrics, such as an Impact Radius Score, to evaluate how the issue could affect other components or processes.

The recommendation is then presented in a user-friendly format, providing actionable insights, justification based on the comparison results, and possible alternative solutions. By systematically evaluating component behavior against expected outcomes, the system ensures proactive issue resolution, improving the reliability and efficiency of the software application.

In some embodiments, the system may determine the first recommendation based on the first output by determining a failure likelihood for the one or more components based on the first output and determining first content for the first recommendation based on the failure likelihood. For example, the system determines the first recommendation based on the first output by evaluating the failure likelihood of the one or more components and tailoring the recommendation accordingly. This process begins with the system analyzing the first output generated by the AI model, which may include insights related to system performance, anomalies, or inefficiencies. Using this output, the system calculates a failure likelihood for each relevant component by assessing various factors such as historical failure rates, deviation from expected behavior, frequency of anomalies, error severity, and interdependencies with other components. The system may also incorporate machine learning-based predictive analytics to estimate the probability of component failure based on patterns in past event data and system behavior.

Once the failure likelihood is determined, the system uses this information to generate the first recommendation, adjusting its content based on the level of risk and urgency. If the failure likelihood is high, the recommendation may include immediate corrective actions, such as restarting a service, rolling back a deployment, applying a patch, or reallocating resources to prevent an impending failure. If the failure likelihood is moderate, the system may suggest monitoring the component more closely, adjusting system configurations, or scheduling preventive maintenance. For low-risk components, the recommendation may focus on long-term optimizations, such as refining software architecture, optimizing resource utilization, or implementing best practices for system stability.

Additionally, the recommendation may include an Impact Radius Score, which evaluates the potential cascading effects of a failure across interconnected systems, helping users prioritize resolution efforts. The system presents the recommendation in a structured format within the user interface, including supporting insights, failure likelihood percentages, risk assessments, and alternative solutions. By dynamically adjusting recommendations based on failure likelihood, the system enhances proactive issue resolution, minimizing downtime, and improving overall software reliability and efficiency.

In some embodiments, the system may determine the first recommendation based on the first output by determining a first failure likelihood for the one or more components when performing the first process, determining a dependent component of the one or more components based on a first software applications lineage log, and determining a second failure likelihood for the dependent component based on the first failure likelihood. For example, the system determines the first recommendation based on the first output by first evaluating the failure likelihood of the one or more components involved in executing the first process. This begins with analyzing the first output from the AI model, which identifies anomalies, inefficiencies, or patterns that indicate potential system failures. Using historical failure data, real-time event monitoring, and predictive machine learning models, the system calculates a first failure likelihood for each component, quantifying the probability of failure based on factors such as error frequency, performance deviations, dependency interactions, and system health metrics.

Next, the system examines the first software applications lineage log to determine a dependent component-a component that relies on or interacts with the potentially failing component. The system assesses the dependencies by mapping inter-component interactions, data flow sequences, and execution hierarchies recorded in the lineage log. This step helps the system understand the cascading impact that a failure in one component might have on others within the software ecosystem.

Once the dependent component is identified, the system determines a second failure likelihood for this component by factoring in the risk posed by the first component's failure. If the first component has a high failure likelihood, the dependent component's risk increases accordingly, especially if it relies on critical inputs, shared resources, or synchronous processes from the first component. The system may apply probabilistic risk models, dependency impact scores, or historical failure propagation data to quantify the second failure likelihood.

Using these insights, the system generates the first recommendation, prioritizing corrective actions based on the cascading failure risks. If both components exhibit high failure likelihoods, the recommendation may include immediate intervention, such as applying patches, rerouting dependencies, or deploying redundancy mechanisms. If only the first component shows a high likelihood of failure while the dependent component remains stable, the system may suggest targeted optimizations to prevent downstream impact. The recommendation is then presented to users with detailed risk assessments, dependency impact analysis, and suggested mitigation strategies, enabling proactive system maintenance and minimizing potential disruptions.

In some embodiments, the system may determine the first recommendation based on the first output by determining, based on the first output, a variance from the first software applications lineage log for the one or more components based on the first output and determining an update to the first software applications lineage log based on the variance. For example, the system determines the first recommendation based on the first output by analyzing deviations between the actual behavior of one or more components and their expected behavior as recorded in the first software applications lineage log. The process begins with the system evaluating the first output generated by the artificial intelligence (AI) model, which may highlight anomalies, unexpected errors, or performance deviations detected during the execution of the first process. Using this output, the system identifies a variance-a measurable difference between the actual system behavior and the historical or expected behavior recorded in the lineage log. This variance may be based on factors such as unexpected event sequences, component execution delays, missing dependencies, abnormal error frequencies, or deviations in data flow patterns.

Once the system detects this variance, it determines an update to the first software applications lineage log to reflect the newly observed system behavior. This update may include revised execution sequences, adjusted timestamps, newly identified dependencies, or newly detected failure points that were not previously documented in the lineage log. The update process ensures that the lineage log remains an accurate, real-time representation of how the software system operates under current conditions, improving its usefulness for monitoring, debugging, and predictive analysis.

Based on the variance analysis and updated lineage log, the system generates the first recommendation, which may include corrective actions to address detected anomalies, optimizations to improve performance, or structural changes to enhance system resilience. If the variance indicates a recurring pattern of failures, the system may recommend retraining the AI model using the updated lineage data to improve future predictions. Additionally, the system may provide risk assessments, dependency impact evaluations, and recommended process modifications to ensure stability. The recommendation is then presented to users in a structured format, allowing for proactive system management, data-driven decision-making, and continuous improvement of software reliability and efficiency.

In some embodiments, the system may determine the first recommendation based on the first output by determining, based on the first event data, a first route through the one or more components when performing the first process, determining, based on the first output, a first expected route through the one or more components when performing the first process, and comparing the first route to the first expected route. For example, the system determines the first recommendation based on the first output by analyzing the actual execution path of a process through the software system and comparing it to the expected execution path. This process begins with the system examining the first event data to identify the first route taken through the one or more components during the execution of the first process. The first route represents the actual sequence of component interactions, including data transfers, function calls, and dependencies observed in real time. The system reconstructs this route by analyzing timestamps, event logs, system traces, and component relationships recorded during the process execution.

Next, the system determines a first expected route based on the first output generated by the artificial intelligence (AI) model. The expected route represents the ideal or predefined process flow that should occur under normal operating conditions. This route may be derived from historical lineage logs, system documentation, business process rules, or predictive AI models trained on past executions of the same process. The expected route defines the correct sequence of component interactions, ensuring efficiency, reliability, and intended system functionality.

Once the system identifies both the actual and expected routes, it performs a comparison to detect discrepancies. If the actual route deviates from the expected route, the system analyzes the cause of the variance. Deviations may indicate unexpected component failures, unoptimized execution paths, unnecessary delays, missing dependencies, or potential security vulnerabilities. By evaluating the differences, the system can quantify the impact of the divergence, determine whether it affects system performance, and assess potential risks.

Based on this analysis, the system generates the first recommendation, suggesting corrective actions to realign the process execution with the expected route. If a deviation is caused by an inefficient or redundant component interaction, the system may recommend restructuring the process flow, rerouting data transfers, or optimizing system configurations. If the deviation is caused by a failure or missing dependency, the recommendation may include fixing broken connections, reconfiguring failed components, or implementing redundancy mechanisms. The recommendation may also include an Impact Radius Score, highlighting the potential cascading effects of deviations on dependent components. Finally, the system presents the recommendation within the user interface, providing a visual comparison of the actual vs. expected routes, a detailed breakdown of detected variances, and actionable insights for process optimization. By continuously refining process execution through AI-driven analysis, the system enhances performance, reliability, and resilience in software applications.

In some embodiments, the system may determine the first recommendation based on the first output by determining, based on the first event data, a first error when performing the first process and determining, based on the first output, a first modification corresponding to the first error. For example, the system determines the first recommendation based on the first output by identifying an error in the execution of the first process and suggesting a corresponding modification to resolve or mitigate the issue. This begins with the system analyzing the first event data, which includes logs, traces, metrics, and other recorded information from the execution of the first process. By applying error detection algorithms, pattern recognition, or anomaly detection models, the system identifies a first error that occurred during the process. The detected error could be related to component failures, unexpected delays, incorrect outputs, dependency mismatches, security vulnerabilities, or inefficiencies in process execution.

Once the first error is identified, the system references the first output generated by the AI model, which may provide insights such as root cause analysis, error classification, severity assessment, and historical trends of similar issues. Using this output, the system determines a first modification that corresponds to the identified error. The modification may involve adjusting system configurations, re-routing process flows, optimizing resource allocations, updating software components, applying patches, or modifying code logic to prevent future occurrences of the error. The system evaluates multiple possible modifications and selects the most effective one based on factors such as historical success rates, impact analysis, and dependency resolution strategies.

The recommendation is then structured and presented to the user in a clear, actionable format. It may include a description of the detected error, the suggested modification, a comparison of expected vs. actual outcomes, and a projected impact analysis if the modification is applied. Additionally, the system may provide alternative modifications to give users flexibility in resolving the issue. By dynamically detecting errors and determining targeted modifications, the system enhances efficiency, stability, and resilience in software application processes, reducing downtime and improving overall performance.

In some embodiments, the system may determine the first recommendation based on the first output by determining, based on the first output, an impact radius of the first process and determining, based on the impact radius, a second process effected by the first. For example, the system determines the first recommendation based on the first output by analyzing the impact radius of the first process and identifying additional processes that may be affected. This process begins with the system evaluating the first output generated by the AI model, which provides insights into how the first process interacts with various components, dependencies, and other processes within the software system. The system determines the impact radius by assessing the breadth and depth of the first process's influence, taking into account factors such as data dependencies, shared resources, communication pathways, failure propagation risks, and historical impact patterns recorded in software application lineage logs.

Once the system establishes the impact radius, it analyzes how the failure, inefficiency, or modification of the first process could influence other interconnected processes. The system then identifies a second process that is affected by the first, using dependency mapping, causal inference models, or historical event correlation analysis. The second process may be indirectly impacted due to shared components, sequential dependencies, or reliance on outputs from the first process. If the first process experiences a failure or performance degradation, it may cause delays, incorrect outputs, or cascading errors in the second process, potentially disrupting overall system functionality.

Based on this analysis, the system generates a first recommendation that addresses not only the detected issue in the first process but also its broader implications on the second process. The recommendation may include preventative measures such as process isolation, alternative execution paths, system redundancy, or dependency reconfigurations to mitigate risk. Additionally, the system may provide an Impact Radius Score, quantifying the level of risk and severity of the cascading effect on interconnected processes. The recommendation is then presented to the user in a structured format, providing detailed insights into the detected impact, affected processes, and proposed solutions. By proactively assessing and mitigating systemic risks, the system enhances resilience, stability, and efficiency across all software processes.

In some embodiments, the system may determine the first recommendation based on the first output by determining, based on the first event data, a first route through the one or more components when performing the first process, determining, based on the first output, a first expected route through the one or more components when performing the first process, and comparing the first route to the first expected route. For example, The system determines the first recommendation based on the first output by analyzing and comparing the actual execution path of a process with the expected execution path. This process begins with the system extracting first event data that documents how the first process was executed through one or more components. The system reconstructs the first route, which represents the actual sequence of component interactions, data flows, and dependencies observed during the execution of the first process. This route is derived from event logs, system traces, transaction records, and process execution data, capturing timestamps, error occurrences, and component transitions.

Next, the system determines a first expected route based on the first output generated by the AI model. This expected route defines the ideal or predefined process flow that should occur under normal operating conditions. It is derived from historical lineage logs, system documentation, predefined business rules, or predictive AI models that capture how the process should be executed efficiently. The expected route serves as a baseline for comparison, ensuring that the system functions optimally and adheres to best practices.

Once both routes are established, the system performs a comparative analysis to identify deviations, anomalies, or inefficiencies. Discrepancies may indicate unexpected process failures, redundant steps, missing dependencies, security vulnerabilities, or performance inefficiencies. If the first route deviates from the expected route, the system assesses the severity and impact of the variance. It quantifies the deviation in terms of execution delays, error propagation, processing inefficiencies, and system stability risks.

Using this analysis, the system generates the first recommendation, which may include corrective actions, performance optimizations, or process realignments. If the deviation is due to an error or failure, the recommendation may suggest component reconfiguration, dependency resolution, or system patching. If the variance is performance-related, the system may propose route optimizations, redundant step removal, or resource reallocation to enhance efficiency. The recommendation may also include an Impact Radius Score, highlighting the potential cascading effects of deviations on interconnected processes. Finally, the system presents the recommendation in a user-friendly interface, providing a visual comparison of the actual vs. expected routes, a breakdown of detected variances, and actionable solutions. By continuously refining process execution through AI-driven analysis, the system ensures optimal performance, reliability, and resilience across all software applications.

In some embodiments, the system may determine the first recommendation based on the first output by determining, based on the first output, a second process dependent on the first process, determining, based on the first event data, a first effect on the second process, and determining first content for the first recommendation based on the first effect. For example, the system determines the first recommendation based on the first output by analyzing how the first process affects a second process that depends on it. This begins with the system identifying, based on the first output generated by the AI model, a second process that is dependent on the first process. The system examines software application lineage logs, dependency mappings, and process execution histories to establish how the second process relies on the first, whether through data outputs, shared resources, sequential task execution, or component interactions.

Once the dependency is identified, the system analyzes the first event data to determine a first effect on the second process. The first effect could include delays, incorrect data propagation, partial execution failures, resource contention, or cascading errors caused by an issue in the first process. The system evaluates the severity of this effect using real-time monitoring, historical impact assessments, and predictive failure modeling. If the first process encounters a failure, the system quantifies how this impacts the execution flow, stability, or performance of the second process, considering factors such as execution time deviations, dependency errors, or increased system resource consumption.

Using the first effect analysis, the system determines first content for the first recommendation, ensuring that the solution addresses both the first process's issue and its downstream impact on the second process. If the failure in the first process significantly disrupts the second process, the recommendation may include immediate corrective actions such as process rerouting, dependency failovers, or system recovery measures. If the effect is moderate, the system may suggest performance optimizations, temporary workarounds, or scheduled maintenance. For minimal impact, the recommendation may focus on long-term improvements, such as code refactoring, better process isolation, or optimizing inter-process communications. The system then presents the recommendation in a structured format, providing detailed insights into the detected dependency, the effect on the second process, potential risks, and actionable steps for mitigation. By proactively identifying and addressing the impact of process dependencies, the system enhances system stability, operational efficiency, and overall resilience of the software application.

In some embodiments, the system may determine the first recommendation based on the first output by determining, based on the first event data, a first error in one or more components, determining, based on the first output, a modification to the one or more components in response to the first error, and determining first content for the first recommendation based on the modification. The system determines the first recommendation based on the first output by identifying an error in one or more components, suggesting a modification to resolve the issue, and generating recommendation content based on the modification. This process begins with the system analyzing the first event data to detect a first error occurring in one or more components during the execution of a process. The system utilizes log analysis, anomaly detection algorithms, and AI-driven pattern recognition to identify deviations from expected behavior, such as component failures, performance bottlenecks, incorrect outputs, or unexpected delays. By cross-referencing this data with historical logs and system benchmarks, the system determines whether the detected anomaly is a recurring issue or a new failure pattern.

Once the error is identified, the system references the first output generated by the AI model to determine an appropriate modification to the affected components. The modification could involve reconfiguring component settings, applying a software patch, adjusting resource allocations, rerouting dependencies, optimizing execution logic, or rolling back to a stable version. The system evaluates different modification options, considering factors such as historical resolution effectiveness, impact on dependent processes, and potential risks of implementation.

Using the identified modification, the system then determines the first content for the first recommendation, ensuring that it includes all relevant details needed for resolution. The recommendation may outline specific modification steps, expected outcomes, risk assessments, and alternative solutions in case the primary modification is not feasible. If the issue is critical, the recommendation may prioritize immediate corrective actions, while lower-priority issues may suggest gradual optimizations or future updates. The system may also provide Impact Radius Scores to highlight the potential cascading effects of the modification on other components and processes.

Finally, the recommendation is presented in a structured format, offering clear insights into the detected error, the suggested modification, the projected impact analysis, and actionable next steps. By proactively detecting errors and determining targeted modifications, the system ensures efficient troubleshooting, improved system performance, and enhanced resilience across software components.

In some embodiments, the system may determine the first recommendation based on the first output by determining, based on the first event data, a first error in the first software applications lineage log and determining, based on the first output, to throttle processes performed by the one or more components in response to the first error. For example, the system determines the first recommendation based on the first output by identifying an error in the first software applications lineage log and assessing whether throttling processes performed by one or more components is an appropriate response. The process begins with the system analyzing the first event data to detect a first error within the software applications lineage log. This error could indicate anomalies such as unexpected delays, incorrect data propagation, missing dependencies, excessive resource consumption, or system-wide bottlenecks. By leveraging AI-driven anomaly detection, log analysis, and historical data comparisons, the system determines whether the error is an isolated event or part of a recurring pattern that could impact system performance.

Once the error is identified, the system references the first output generated by the AI model to determine an appropriate response strategy. If the output suggests that the error is causing overload conditions, excessive processing demands, or performance degradation in one or more components, the system evaluates throttling as a mitigation strategy. Throttling may involve limiting the rate of incoming requests, delaying non-essential processes, prioritizing critical tasks, or redistributing workloads to maintain system stability. The decision to throttle is based on factors such as real-time resource availability, historical failure trends, dependency impact analysis, and system thresholds for performance degradation.

Using this analysis, the system generates the first recommendation, specifying when, where, and how throttling should be applied. The recommendation may outline specific components to throttle, the expected performance improvements, potential risks of over-throttling, and alternative optimization strategies. If throttling is deemed necessary, the system may suggest gradual throttling mechanisms, dynamic workload redistribution, or load-balancing strategies to minimize disruption while resolving the issue. Additionally, the recommendation may include Impact Radius Scores to assess the potential cascading effects of throttling on other interconnected processes. Finally, the recommendation is presented in a structured format within the user interface, providing detailed insights into the detected lineage log error, the proposed throttling approach, expected outcomes, and implementation options. By dynamically adjusting system workloads based on real-time analysis, the system enhances performance stability, prevents cascading failures, and optimizes overall resource utilization.

In some embodiments, the system may determine the first recommendation based on the first output by determining, based on the first event data, a first code error when executing the first process, determining, based on the first output, a modification to code for the one or more components in response to the first error, and determining first content for the first recommendation based on the modification. For example, the system determines the first recommendation based on the first output by identifying a first code error occurring during the execution of the first process, determining an appropriate code modification to address the error, and generating recommendation content based on the modification. This process begins with the system analyzing first event data, which includes system logs, traces, and execution metrics, to detect anomalies or failures related to code execution. The system applies AI-driven anomaly detection, static code analysis, and pattern recognition to identify errors such as syntax issues, runtime exceptions, logical inconsistencies, memory leaks, or inefficient code execution. The detected first code error is then classified based on its impact, severity, and historical recurrence within the system.

Once the error is identified, the system references the first output generated by the AI model to determine a modification to the code for one or more components affected by the issue. The AI model may analyze historical debugging patterns, best practices, code repositories, and previous successful fixes to recommend an optimized modification. The suggested code modification could include correcting logic errors, optimizing inefficient algorithms, fixing syntax issues, improving memory management, or updating API calls. If the issue is complex, the system may generate multiple alternative modifications with a comparison of their potential effectiveness and risks.

Using this analysis, the system determines the first content for the first recommendation, ensuring that it provides a structured and actionable resolution plan. The recommendation may include a description of the detected error, the suggested code modification, an explanation of the impact of the modification, and a risk assessment. If necessary, the system may include code snippets or automated fixes to streamline implementation. Additionally, the recommendation may assess the Impact Radius Score, highlighting whether the modification affects dependent processes or interconnected components. Finally, the recommendation is presented in a clear, user-friendly format, allowing developers and system administrators to review, validate, and implement the suggested code modifications efficiently. By leveraging AI-driven code analysis and modification recommendations, the system enhances software reliability, reduces debugging time, and improves overall system performance.

In some embodiments, the system may determine the first recommendation based on the first output by determining, based on the first output, an inconsistency between a determined configuration for a first component of the one or more components and an expected configuration based on the first software applications lineage log and determining first content for the first recommendation based on the inconsistency. For example, the system determines the first recommendation based on the first output by identifying configuration inconsistencies in a component and generating a structured resolution plan. The process begins with the system analyzing the first output generated by the AI model, which evaluates the configuration settings of a first component within the software system. The system then compares the determined configuration of the first component-representing its actual current settings—to the expected configuration recorded in the first software applications lineage log. The expected configuration serves as a benchmark based on historical configurations, predefined system standards, and best practices for optimal performance.

During this comparison, the system detects inconsistencies, such as incorrect parameter settings, missing dependencies, version mismatches, misaligned resource allocations, or security vulnerabilities caused by improper configurations. The system assesses the impact of the inconsistency, determining whether it contributes to performance degradation, operational failures, security risks, or inefficiencies. If the detected inconsistency has previously led to system failures or degraded performance, the AI model may reference historical resolution patterns to guide the recommendation process.

Based on this analysis, the system determines the first content for the first recommendation, ensuring it provides a structured resolution strategy. The recommendation may include specific configuration changes, justification for each modification, a risk assessment of maintaining the inconsistent configuration, and potential downstream effects on dependent processes. If applicable, the system may suggest automated configuration updates, rollback options, or validation procedures to ensure a smooth transition. Additionally, an Impact Radius Score may be provided to highlight the extent of the configuration inconsistency's effect on other components or processes.

At step 510, process 500 (e.g., using one or more components described above) generates the recommendation. For example, the system may generate, on a user interface, the first recommendation. The system presents the recommendation in a clear and actionable format, allowing users to quickly review, validate, and implement the suggested configuration adjustments. By continuously monitoring and correcting configuration inconsistencies, the system enhances stability, security, and overall efficiency in software applications.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 5.

Figure 6:
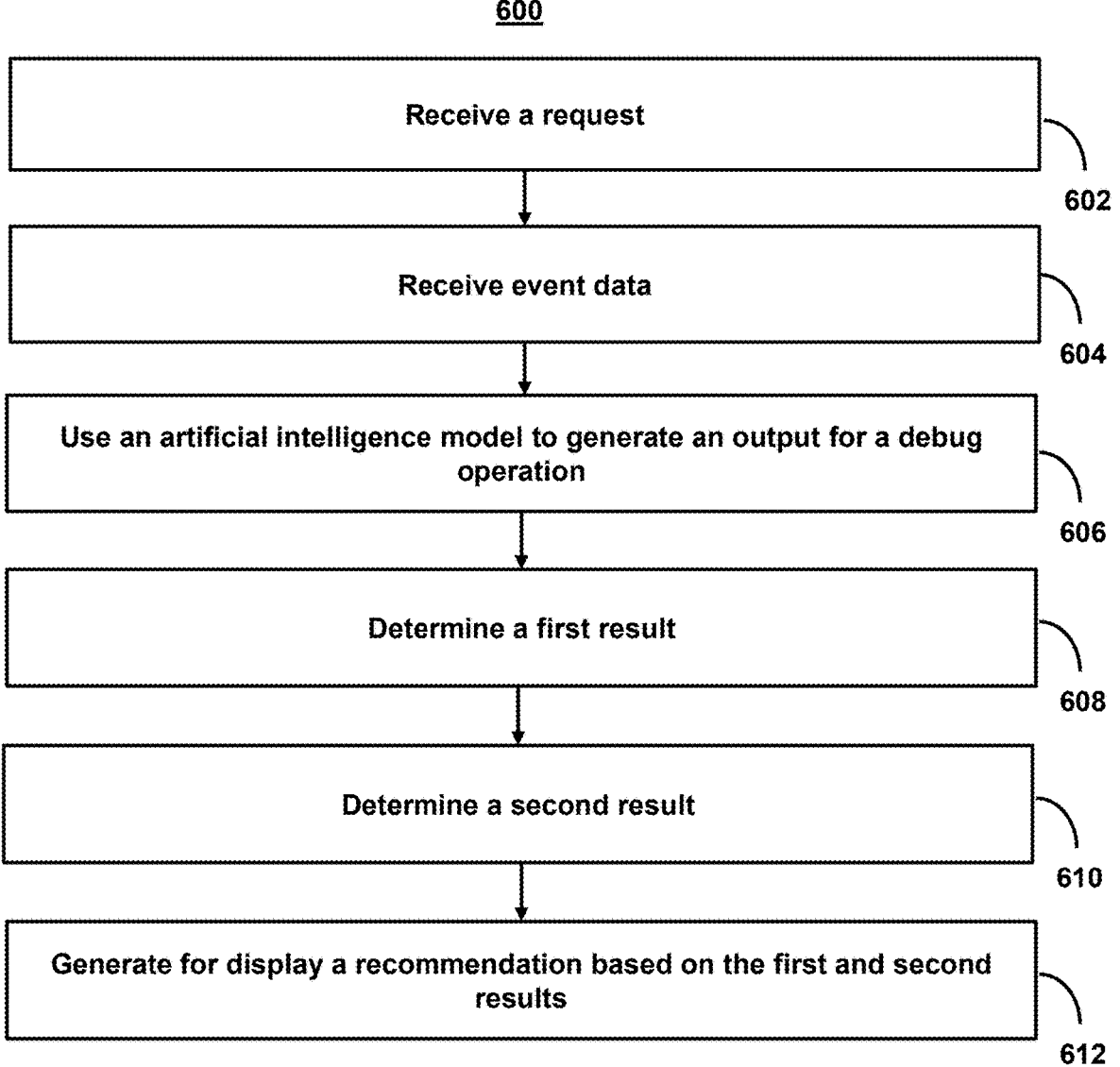
FIG. 6 is a flow diagram illustrating operations involved in using a software applications lineage log to debug a component, in accordance with one or more embodiments.

FIG. 6 is a flow diagram illustrating operations involved in using a software applications lineage log to debug a component, in accordance with one or more embodiments. For example, process 600 may use a software applications lineage log to determine the root cause of errors during the execution of multiple applications. In some embodiments, process 600 can include more or fewer operations than shown.

At step 602, process 600 (e.g., using one or more components described above) receives a request. For example, the system may receive an instruction (e.g., via a user interface as shown in FIGS. 1A-C) to monitor a component, application, and/or process. In one embodiment, a root cause analysis server may detect a cause analysis instruction identifying one or more systems. For example, the root cause analysis server can detect a cause analysis instruction identifying one or more systems and error metadata associated with an executable operation, the one or more systems associated with one or more operation errors as described herein. In an example, the root cause analysis server can detect a cause analysis instruction based on the root cause analysis server receiving a message from one or more computing devices (e.g., computing devices that are the same as, or similar to, one or more servers, one or more client devices, or one or more admin devices. In examples, the message can represent the cause analysis instruction. For example, the message can include one or more of a request identifier, an application name identifier, or an error type identifier and/or other key-value pairs of data associated with the error. The request identifier can include an identifier specifying that the request is associated with a transaction where the error happened. The application name identifier can include an identifier specifying an application that is associated with a possible failure involved in the execution of one or more processes by the computing device transmitting the message. The error type identifier can include an identifier indicating a specific kind of error from among multiple possible errors associate associated with one or more executable operations involved in the execution of a given application.

The root cause analysis server can determine one or more systems associated with (e.g., involved in) the cause analysis instruction. For example, the root cause analysis server can determine the one or more systems associated with the cause analysis instruction based on one or more identifications of one or more systems by the cause analysis instruction. In examples, the root cause analysis server determines the one or more systems associated with the cause analysis instruction based on the error metadata included in the cause analysis instruction. In this example, the error metadata can identify (e.g., be mapped to) the one or more systems involved in executable operations that are the same as, or similar to, the executable operation involved in the cause analysis instruction. In examples, the error metadata can be used by the root cause analysis server to look up the one or more systems involved.

The root cause analysis server can determine whether error details are available based on the cause analysis instruction. For example, the root cause analysis server can determine whether error details are available based on the root cause analysis server requesting the error details from one or more computing devices. In some examples, the root cause analysis server can request the error details from an error details database that collects data associated with executable operations involving at least one error. In examples, the root cause analysis server can request the error details from the computing device that transmitted the cause analysis instruction. In some examples, the root cause analysis server can request the error details from one or more other systems. In these examples, the one or more other systems can include the one or more other systems determined by the root cause analysis server as being associated with the cause analysis instruction or involved in executing one or more applications involved in the cause analysis instruction. In some embodiments, where the root cause analysis server does not receive error details, the root cause analysis server can determine that error details are not available and transmit a response (e.g., to the device that initiated the cause analysis instruction) that operation errors were not detected. In embodiments, where the root cause analysis server receives error details, the root cause analysis server can determine one or more results corresponding to debug operations as described herein.

At step 604, process 600 (e.g., using one or more components described above) receives event data. For example, in response to receiving the request, the system may retrieve a software applications lineage log to identify event data resulting from a component, application, and/or process that is being monitored. For example, the root cause analysis server may receive error metadata associated with a first operation error of the one or more operation errors. In an example, the root cause analysis server can receive the error metadata associated with the first operation error of the one or more operation errors based on the root cause analysis server analyzing the error metadata (e.g., the metadata associated with the cause analysis instruction). For example, the root cause analysis server can receive data associated with a first operation error where the data associated with the first operation error is included with the cause analysis instruction (e.g., by the computing device that transmitted the cause analysis instruction). In examples, the root cause analysis server can receive data associated with the first operation error based on the root cause analysis server transmitting the request for error details as described above.

In examples, the root cause analysis server can query an error details database for the error details based on the error metadata. The error details database may be involved in monitoring (e.g., may be receiving and indexing error metadata transmitted by one or more devices described herein and/or obtained by the root cause analysis server) execution of one or more applications by one or more computing devices across a distributed computing environment that are further associated with an organization, the one or more computing devices including the computing device involved in the cause analysis instruction. In these examples, the root cause analysis server can receive the data associated with the first operation error from the error details database.

The first operation error can be associated with an error that occurs during the execution of an application. For example, the first operation error can be associated with an error that occurs during execution of an application by a client device. In examples, the first operation error can be associated with an executable operation involved in the execution of the first operation. An executable operation can include the execution of a process in connection with the first application by the client device. In examples, the first operation error can be associated with an error that occurs at a device other than the client device during execution of an application by a client device. In these examples, the first operation error can be associated with the execution of a process in connection with the first application by another device (e.g., a server) involved in the executable operation. In examples, the first operation error can be associated with the execution of a process by another application involved in the execution of the application by the client device. In one illustrative example, the first operation error can be associated with the execution of a process by an application implemented by one or more servers in coordination with the process of the application executed by the client device.

In one illustrative example, where an application is executed by a client device, an executable operation can involve generating and communicating data between the client device and a server. A first operation error can occur where data is unavailable or otherwise cannot be transmitted by the server to the client device (e.g., a session could not be established or reestablished, the data was not available due to a failure of one or more upstream or downstream processes, and/or the like) in response to communications from the client device. In this way, the first operation error can be associated with one or more errors that occur at one or more other devices involved in an executable operation.

At step 606, process 600 (e.g., using one or more components described above) uses an artificial intelligence model to generate an output for a debug operation. For example, the system may use the software applications lineage log and the event data to determine an error in code used by a component, application, and/or process. The system may then determine a potential remedy. In an example, the root cause analysis server can determine the first debug operation set associated with the first operation error of the one or more operation errors based on the error metadata and one or more of a first operation error, an error type associated with the first operation error, or an application identified as being associated with the first operation error. For example, the root cause analysis server can determine the first debug operation set based on the root cause analysis server comparing the error metadata to predefined error scenario criteria for a debug operation set. In this example, the error metadata (e.g., one or more of the fields of the error metadata that match one or more fields of the error scenario criteria) can correspond to one or more debug operation sets (e.g., debug operation sets corresponding to the given error scenario), and the root cause analysis server can determine the first debug operation set based on the root cause analysis server determining the correspondence between the error metadata of the cause analysis instruction, and the correspondence of the error metadata to the error scenario criteria of one or more debug operation sets. In one illustrative example, where the error metadata corresponds to an executable operation involving an application executed by a client device and where the first operation error corresponds to one or more predetermined error scenario for that application, the root cause analysis server can determine a correspondence between the first operation error and a predetermined error scenario for that application. The root cause analysis server can then determine a correspondence between the predetermined error scenario and the first debug operation set.

The first debug operation set can be associated with one or more debug operations. For example, the first debug operation set can be associated with one or more debug operations that can be performed by the root cause analysis server. In some embodiments, the one or more debug operations may be associated with discrete processes that are executed to isolate errors that can occur during execution of applications that are the same as, or similar to, the application involved in the causes analysis instruction. Each of the one or more debug operations of a debug operation set can return one or more values associated with the execution of processes implemented by an application. The root cause analysis server can recursively determine and evaluate subsequent debug operations in a debug operation set until a report generating operation is determined. In some embodiments, the root cause analysis server can execute the report generating operation and generate an error report based on the result of all the preceding debug operations.

In some embodiments, the error report generated by the report generating operation may contain data that maps to a predefined error scenario for the subsequent debug operation set. The root cause analysis server can keep executing all the debug operations of each of the subsequent debug operation sets until the error report generated by the last debug operation of a current debug operation set does not map to any predefined error scenario of any of one or more subsequent debug operation sets. In this way, the root cause analysis server can maintain a stack of error reports (including error report outputs) for debug operation sets as the root cause analysis server steps through a hierarchy of debug operations and debug operation sets to determine the source of an error as opposed to stepping through multiple debug operations (e.g., associated with suspected upstream and/or downstream errors) until finding an error and working forward or backward from that error until determining a root cause for the error. In some embodiments, the root cause analysis server can determine (e.g., execute) the one or more debug operations of the first debug operation set or any other debug operation set involved in (e.g., mapped to) a root cause analysis described herein until the root cause analysis server cannot determine the subsequent debug operation set. In this way, the root cause analysis server can generate a report as described herein where the report includes results associated with each debug operation of a given debug operation set being evaluated by the root cause analysis server.

The debug operations of a debug operation set (e.g., the first debug operation set or other debug operation sets as described herein) may be associated with a hierarchy. For example, the debug operations of a debug operation set may be associated with a hierarchy (sometimes referred to as a mapping) that corresponds to an order in which one or more processes associated with an application are executed. In some embodiments, the debug operations may be associated with the execution of the application by one device (e.g., a client device). In embodiments, the debug operations may be associated with the execution of multiple processes involving multiple computing devices. In one illustrative example, where a client device executes an application that transmits a request for data from another device (e.g., a server), a first debug operation may be associated with a process involved in generating the request by the client device. In this example, a second debug operation may be associated with a process involved in determining the data to provide in response by the server. In this way, the debug operations may correspond to one or more processes that are executed chronologically during the execution of processes involving one or more applications.

At step 608, process 600 (e.g., using one or more components described above) determines a first result. For example, the root cause analysis server determines a first result associated with a first debug operation of the first debug operation set. For example, the root cause analysis server can determine the first result associated with the first debug operation based on the root cause analysis server executing one or more processes associated with the first debug operation. In an example, the first debug operation can be for data gathering associated with the first debug operation set (e.g., for one or more debug operations of the first debug operation set. In examples, the root cause analysis server can continue to execute processes associated with the first debug operation and subsequent processes associated with subsequent debug operations of the first debug operation set in accordance with a hierarchy corresponding to the first debug operation set.

In some embodiments, the root cause analysis server determines the first result based on data associated with the execution of the executable operation. For example, as noted above, the root cause analysis server can request the error details for the executable operation associated with the cause analysis instruction (e.g., from an error details database). In an example, the root cause analysis server can receive data associated with execution of the executable operation from the computing device associated with the cause analysis instruction or the error details database. In this example, the data associated with execution of the executable operation can include an event log and/or the like. In some embodiments, the root cause analysis server can then determine the first result based on the data associated with the execution of the executable operation. For example, the root cause analysis server can determine the first result based on the root cause analysis server executing one or more processes associated with the first debug operation.

At step 610, process 600 (e.g., using one or more components described above) determines a second result. For example, example, the root cause analysis server can determine a second result associated with a second debug operation of the first debug operation set. The second debug operation can be associated with a report generation operation. In examples, the root cause analysis server can determine a second result associated with a second debug operation, where the second debug operation is associated with a second debug operation set. In these examples, the root cause analysis server can determine the second result based on the root cause analysis server determining that the debug operations of the debug operation set were all executed and the generated error report was indicative of (e.g., mapped to) the second debug operation set.

In some embodiments, the root cause analysis server determines the second result based on data associated with the execution of the executable operation. For example, as noted above, the root cause analysis server can request the error details for the executable operation associated with the cause analysis instruction (e.g., from an error details database). In some embodiments, the root cause analysis server can receive data associated with execution of the executable operation based on the root cause analysis server requesting the error details for the executable operation based on (e.g., subsequent to) the root cause analysis server determining the result. For example, the root cause analysis server can request additional data associated with the execution of the executable operation based on the root cause analysis server determining that the result indicates the successful completion of one or more operations by one or more systems involved in the executable operation. The root cause analysis server can then receive the additional data and update the error metadata associated with the execution of the executable operation.

In some embodiments, the root cause analysis server can determine the second result based on the first result and the data associated with the execution of the executable operation. For example, the root cause analysis server can determine the second result associated with the second debug operation based on the root cause analysis server executing (or causing execution of) one or more processes associated with the second debug operation. In this example, the root cause analysis server can execute the one or more processes associated with the second debug operation based on the first result or the data associated with the execution of the executable operation. In some embodiments, the data associated with the execution of the executable operation can represent a state of the executable operation being analyzed by the root cause analysis server after successful execution of the one or more processes associated with the first debug operation.

In some embodiments, the second debug operation is associated with a second debug operation set that includes one or more debug operations that are different from the one or more debug operations of the first debug operation set. For example, each debug operation set may be designed to target one or more predetermined error scenarios for identification. In this example, each debug operation set may also identify one or more subsequent debug operation sets. In this way, a given debug operation set can indicate one or more processes to perform in order to determine a root cause.

In some embodiments, where the first result and the second result are associated with one or more values, the root cause analysis server executes a second debug operation that can compare the one or more values to one or more accepted values (e.g., values corresponding to accepted outputs, described above). For example, where an executable operation involves one or more processes that can result in the generation of values within specific ranges, and the first debug operation is configured to gather the data associated with the values generated by the executable operation. In this example the root cause analysis server can execute a second debug operation that can compare the one or more values determined during the analysis of the instant executable operation by the root cause analysis server to the values within the specific ranges. Where the values associated with the instant executable operation satisfy the values associated with the specific range, the root cause analysis server can determine the first result (e.g., that the values are accepted values) is associated with successful execution of an executable operation. Where the values associated with the instant executable operation do not satisfy the values associated with the specific range, the root cause analysis server can determine the first result is associated with unsuccessful execution of the executable operation. In this way, the root cause analysis server can determine whether one or more criteria associated with a predetermined error (e.g., values outside of acceptable value ranges) are satisfied and the subsequent report generating debug operation determined by the root cause analysis server can determine the root cause based on the one or more criteria being satisfied.

At step 612, process 600 (e.g., using one or more components described above) generates a recommendation based on the first and second results. For example, the root cause analysis server executes an error report generating a debug operation that generates an error report based on the first result and the second result. For example, the debug operation executed by the root cause analysis server can generate an error report based on the first result and the second result, where the error report includes key-value pairs of data gathered from the first result and the second result. In some embodiments, the error report can contain data that are indicative of a root cause. For example, the root cause analysis server can determine the root cause based on the first result and the second result. In this example, the root cause analysis server can generate the error report where an indicator of the root cause is included in the error report. In some embodiments, the error report can include an indication that the one or more first errors are not present and an indication that one or more second errors are present. In some embodiments, operations 330-360 can be repeated (e.g., executed in a loop) until additional debug operation sets do not map to a given debug operation set, as described herein.

In some embodiments, the root cause analysis server determines a root cause. For example, the root cause analysis server can determine that the second debug operation is associated with one or more errors. In this example, the root cause analysis server can determine the root cause based on the one or more errors associated with the second debug operation. In one illustrative example, where the second debug operation is associated with an error where data is not available in association with a given executable operation, the root cause analysis server can determine that the root cause is associated with the lack of data available for the given executable operation. In this way, a user (e.g., a user associated with an admin device as described herein) can review the report and address the root cause identified by the report without unnecessarily troubleshooting other suspected causes.

In some embodiments, the root cause analysis server generates a report based on the root cause. For example, the root cause analysis server can generate a report based on the root cause analysis server determining results for debug operations. In some examples, where the root cause analysis server determines a root cause is represented by one or more results of a debug operation set, the root cause analysis server can generate a report that includes one or more results determined by the root cause analysis server during the evaluation of one or more debug operation sets. In some embodiments, where the root cause analysis server evaluates multiple debug operation sets, the root cause analysis server can include the one or more results determined during the evaluation of the multiple debug operation sets. In this way, the root cause analysis server can generate a report that includes the results that correspond to a given root cause as described herein. In some embodiments, where the root cause analysis server determines that one or more results are indicative of a root cause (e.g., one or more results of operations included in a debug operation set specify a root cause) the root cause analysis server can generate a report specifying the root cause.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 6.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for real-time mapping and visualization generation of system components and/or generating recommendations based on real-time mapping of system components in software applications lineage logs.

2. The method of the preceding embodiment further comprising: receiving a first user request to generate a first visualization of a first configuration of a first subset of components in a first software system; in response to the first user request, retrieving a first software applications lineage log, wherein the first software applications lineage log comprises a log of event data of current processes being performed in the first software system; generating a first feature input based on the first software applications lineage log; inputting the first feature input into a first artificial intelligence model to generate a first output, wherein the first artificial intelligence model is trained by: generating first training data based on historical software applications lineage logs that indicate respective time stamps, event names, components, or other data for known software system configurations performing known processes; and training, using the first training data, the first artificial intelligence model to generate outputs comprises predicted software system configurations based on inputs of current software applications lineage logs; and generating for display, on a user interface, the first visualization based on the first output.

3. The method of any one of the preceding embodiments wherein generating the first output further comprises: determining a first component in a first hierarchical level in the first configuration; and determining a parent component for the first component based on the first feature input indicating that the parent component inputs processing data to the first component in the first configuration.

4. The method of any one of the preceding embodiments wherein generating the first output further comprises: determining a first component in a first hierarchical level in the first configuration; and determining a child component for the first component based on the first feature input indicating that the child component receives processing data from the first component in the first configuration.

5. The method of any one of the preceding embodiments wherein generating the first output further comprises: determining a first component in a first hierarchical level in the first configuration; and determining a second component in the first hierarchical level in the first configuration based on the first feature input indicating that the first component generates a first event datum within a threshold time of the second component generating a second event datum.

6. The method of any one of the preceding embodiments wherein generating the first output further comprises: determining a first component in a first hierarchical level in the first configuration; and determining a second component in the first hierarchical level in the first configuration based on the first feature input indicating that a third component receives processing data from both the first component and the second component.

7. The method of any one of the preceding embodiments wherein generating the first output further comprises: determining a first component in a first hierarchical level in the first configuration; and determining a second component in the first hierarchical level in the first configuration based on the first feature input indicating that a third component transmits processing data to both the first component and the second component.

8. The method of any one of the preceding embodiments wherein generating the first output further comprises: detecting an inconsistency between a determined hierarchical level in the first configuration for a first component in a first hierarchical level in the first configuration and a first event datum for the first component; and in response to detecting the inconsistency, querying the first software applications lineage log for additional event data.

9. The method of any one of the preceding embodiments wherein generating the first output further comprises: detecting an inconsistency between a determined hierarchical level in the first configuration for a first component in a first hierarchical level in the first configuration and a first event datum for the first component; and in response to detecting the inconsistency, querying a supplemental data source of potential network configurations of the first software system.

10. The method of any one of the preceding embodiments wherein training, using the first training data, the first artificial intelligence model further comprises: training a tree component classifier to classify nodes into component types; and training the tree component classifier to identify edges between the nodes.

11. The method of any one of the preceding embodiments wherein generating for display, on the user interface, the first visualization further comprises: determining a first component in a first hierarchical level in the first configuration; and generating a first architecture diagram of a plurality of components in the first visualization, wherein the first component is included in the plurality of components at the first hierarchical level of the first architecture diagram.

12. The method of any one of the preceding embodiments wherein generating for display, on the user interface, the first visualization further comprises: receiving a first criterion for filtering one or more components in the first visualization; and filtering the one or more components in the first visualization based on the first criterion.

13. The method of any one of the preceding embodiments wherein generating for display, on the user interface, the first visualization further comprises: receiving a first criterion for testing a first component in the first subset of components in the first software system; determining a child component for the first component based on the first configuration; and generating a result based on the first criterion, wherein the result indicates an effect of the first criterion on the child component.

14. The met method of any one of the preceding embodiments wherein generating for display, on the user interface, the first visualization further comprises: determining a plurality of dependencies for the first subset of components in the first software system based on the first configuration; and storing the plurality of dependencies in a centralized repository for the first software system.

15. The method of any one of the preceding embodiments wherein generating for display, on the user interface, the first visualization further comprises: receiving a first criterion for searching for a first component in the first subset of components in the first software system; and generating a result based on the first criterion, wherein the result indicates a location of the first component in the first subset of components.

16. The method of any one of the preceding embodiments wherein generating the first feature input based on the first software applications lineage log further comprises: processing the event data in the first software applications lineage log to remove inconsistencies; and processing the event data in the first software applications lineage log to populate missing data.

17. The method of any one of the preceding embodiments wherein generating the first feature input based on the first software applications lineage log further comprises: processing the event data in the first software applications lineage log to detect a first time stamp; and ordering the event data based on the first time stamp.

18. The method of any one of the preceding embodiments further comprising: retrieving a first software applications lineage log, wherein the first software applications lineage log comprises a log of event data of a first process being performed by one or more components in a first software system; receiving first event data corresponding to the first process; generating a first feature input based on the first software applications lineage log and the first event data; inputting the first feature input into a first artificial intelligence model to generate a first output, wherein the first artificial intelligence model is trained by: generating first training data based on historical software applications lineage logs that indicate respective time stamps, event names, components, or other data for known software system configurations of the one or more components performing known processes; generating second training data based on historical event data, wherein the historical event data is labeled with the respective time stamps, event names, components, or other data for the known software system configurations of the one or more components performing the known processes; and training, using the first training data and the second training data, the first artificial intelligence model to generate outputs; determining a first recommendation based on the first output; and generating for display, on a user interface, the first recommendation.

19. The method of any one of the preceding embodiments wherein determining the first recommendation based on the first output further comprises: determining, based on the first event data, a first component of the one or more components; determining a first expected component output of the first component when performing the first process; and comparing the first expected component output to the first output.

20. The method of any one of the preceding embodiments wherein determining the first recommendation based on the first output further comprises: determining a failure likelihood for the one or more components based on the first output; and determining the first content for the first recommendation based on the failure likelihood.

21. The method of any one of the preceding embodiments wherein determining the first recommendation based on the first output further comprises: determining a first failure likelihood for the one or more components when performing the first process; determining a dependent component of the one or more components based on a first software applications lineage log; and determining a second failure likelihood for the dependent component based on the first failure likelihood.

22. The method of any one of the preceding embodiments wherein determining the first recommendation based on the first output further comprises: determining, based on the first output, a variance from the first software applications lineage log for the one or more components based on the first output; and determining an update to the first software applications lineage log based on the variance.

23. The method of any one of the preceding embodiments wherein determining the first recommendation based on the first output further comprises: determining, based on the first event data, a first route through the one or more components when performing the first process; determining, based on the first output, a first expected route through the one or more components when performing the first process; and comparing the first route to the first expected route.

24. The method of any one of the preceding embodiments wherein determining the first recommendation based on the first output further comprises: determining, based on the first event data, a first error when performing the first process; and determining, based on the first output, a first modification corresponding to the first error.

25. The method of any one of the preceding embodiments wherein determining the first recommendation based on the first output further comprises: determining, based on the first event data, a first route through the one or more components when performing the first process; determining, based on the first output, a first expected route through the one or more components when performing the first process; and comparing the first route to the first expected route.

26. The method of any one of the preceding embodiments wherein determining the first recommendation based on the first output further comprises: determining, based on the first output, a second process dependent on the first process; determining, based on the first event data, a first effect on the second process; and determining first content for the first recommendation based on the first effect.

27. The method of any one of the preceding embodiments wherein determining the first recommendation based on the first output further comprises: determining, based on the first output, an impact radius of the first process; and determining, based on the impact radius, a second process effected by the first.

28. The method of any one of the preceding embodiments wherein determining the first recommendation based on the first output further comprises: determining, based on the first event data, a first error in one or more components; determining, based on the first output, a modification to the one or more components in response to the first error; and determining first content for the first recommendation based on the modification.

29. The method of any one of the preceding embodiments wherein determining the first recommendation based on the first output further comprises: determining, based on the first event data, a first error in the first software applications lineage log; and determining, based on the first output, to throttle processes performed by the one or more components in response to the first error.

30. The method of any one of the preceding embodiments wherein determining the first recommendation based on the first output further comprises: determining, based on the first event data, a first code error when executing the first process; determining, based on the first output, a modification to code for the one or more components in response to the first error; and determining first content for the first recommendation based on the modification.

31. The method of any one of the preceding embodiments wherein determining the first recommendation based on the first output further comprises: determining, based on the first output, an inconsistency between a determined configuration for a first component of the one or more components and an expected configuration based on the first software applications lineage log; and determining first content for the first recommendation based on the inconsistency.

32. The method of any one of the preceding embodiments wherein retrieving the first software applications lineage log further comprises: receiving a first criterion for testing the one or more components in the first software system performing the first process; and determining a first component is included in the one or more components based on the first software applications lineage log.

33. A tangible, non-transitory, computer-readable medium storing instructions that, when executed by a data processing apparatus, cause the data processing apparatus to perform operations comprising those of any of embodiments 1-32.

34. A system comprising one or more processors; and memory storing instructions that, when executed by the processors, cause the processors to effectuate operations comprising those of any of embodiments 1-32.

35. A system comprising means for performing any of embodiments 1-32.

What is claimed is:

1. A system for performing automated software code debugging operations based on real-time mapping of system components in software applications lineage logs, the system comprising:

one or more processors; and one or more non-transitory, computer-readable media comprising instructions that when executed by the one or more processors cause operations comprising:

executing a first process by one or more components in a first software system;

accessing a first input/output path to retrieve, from a distributed file system, a standardized data representation in a computer programming language of a log of event data of the first process performed by the one or more components in the first software system;

parsing the log to extract first event data corresponding to the first process and metadata labels for the first event data, wherein the first event data is generated by the one or more components when performing the first process, wherein the first event data comprises a first subset of data that is output by a first component of the one or more components to a second component of the one or more components, and wherein the first event data comprises a second subset of data that is monitored by a third component that is not one of the one or more components;

transforming the first event data into a structured format for a first artificial intelligence model by normalizing the first event data based on the metadata labels;

transmitting, to an application programming interface ("API") layer housing the first artificial intelligence model, a first API call comprising the first event data in the structured format, wherein the first artificial intelligence model is trained by:

electronically indexing first training data based on historical software applications lineage logs that indicate respective time stamps, event names, components, or other data for known software system configurations performing known processes;

electronically indexing second training data based on historical event data, wherein the historical event data is labeled with the respective time stamps, event names, components, or other data for the known software system configurations performing the known processes; and training, using the first training data and the second training data, the first artificial intelligence model to generate log templates corresponding to processes performed by different known configurations;

determining, by the first artificial intelligence model, a first automated software code debugging operation for the first process based on comparing one or more of the log templates to the first event data to identify an anomaly in code of the first process; and executing the first automated software code debugging operation by re-writing code used to execute the first process removing the anomaly in the code corresponding to the first event data.

2. A method for performing automated software code debugging operations based on real-time mapping of system components in software applications lineage logs, the method comprising:

executing a first process by one or more components in a first software system;

accessing, via an application programming interface ("API") layer, a standardized data representation in a computer programming language of a log of event data of the first process being performed by the one or more components in the first software system;

parsing the log to extract first event data corresponding to the first process;

accessing, via the API layer, a first artificial intelligence model, wherein the first artificial intelligence model is trained by:

electronically indexing first training data based on historical software applications lineage logs that indicate respective time stamps, event names, components, or other data for known software system configurations of the one or more components performing known processes;

electronically indexing second training data based on historical event data, wherein the historical event data is labeled with the respective time stamps, event names, components, or other data for the known software system configurations of the one or more components performing the known processes; and training, using the first training data and the second training data, the first artificial intelligence model to label patterns or anomalies between the historical software applications lineage logs and the historical event data;

determining, by the first artificial intelligence model, a first automated software code debugging operation based on comparing the first event data to the patterns or the anomalies to identify an anomaly in code of the first process; and executing the first automated software code debugging operation by re-writing code used to execute the first process to remove the anomaly.

3. The method of claim 2, wherein determining the first automated software code debugging operation further comprises:

determining, based on the first event data, a first component of the one or more components;

determining a first expected component output of the first component when performing the first process; and comparing the first expected component output to the first event data.

4. The method of claim 2, wherein determining the first automated software code debugging operation further comprises:

determining a failure likelihood for the one or more components based on the first event data; and determining first content for the first automated software code debugging operation based on the failure likelihood.

5. The method of claim 2, wherein determining the first automated software code debugging operation further comprises:

determining a first failure likelihood for the one or more components when performing the first process;

determining a dependent component of the one or more components based on the first event data; and determining a second failure likelihood for the dependent component based on the first failure likelihood.

6. The method of claim 2, wherein determining the first automated software code debugging operation further comprises:

determining a variance from the log for the one or more components based on the first event data; and determining an update to the log based on the variance.

7. The method of claim 2, wherein determining the first automated software code debugging operation further comprises:

determining, based on the first event data, a first route through the one or more components when performing the first process;

determining, based on the first event data, a first expected route through the one or more components when performing the first process; and comparing the first route to the first expected route.

8. The method of claim 2, wherein determining the first automated software code debugging operation further comprises:

determining a first error when performing the first process; and determining, based on the first event data, a first modification corresponding to the first error.

9. The method of claim 2, wherein determining the first automated software code debugging operation further comprises:

determining a second process dependent on the first process;

determining, based on the first event data, a first effect on the second process; and determining first content for the first automated software code debugging operation based on the first effect.

10. The method of claim 2, wherein determining the first automated software code debugging operation further comprises:

determining, based on the first event data, an impact radius of the first process; and determining, based on the impact radius, a second process effected by the first process.

11. The method of claim 2, wherein determining the first automated software code debugging operation further comprises:

determining a first error in the one or more components;

determining, based on the first event data, a modification to the one or more components in response to the first error; and determining first content for the first automated software code debugging operation based on the modification.

12. The method of claim 2, wherein determining the first automated software code debugging operation further comprises:

determining a first error in the log; and determining, based on the first event data, to throttle processes performed by the one or more components in response to the first error.

13. The method of claim 2, wherein determining the first automated software code debugging operation further comprises:

determining a first code error when executing the first process;

determining, based on the first event data, a modification to code for the one or more components in response to the first code error; and determining first content for the first automated software code debugging operation based on the modification.

14. The method of claim 2, wherein determining the first automated software code debugging operation further comprises:

determining, based on the first event data, an inconsistency between a determined configuration for a first component of the one or more components and an expected configuration based on the log; and determining first content for the first automated software code debugging operation based on the inconsistency.

15. The method of claim 2, wherein retrieving the log further comprises:

receiving a first criterion for testing the one or more components in the first software system performing the first process; and determining a first component is included in the one or more components based on the log.

16. One or more non-transitory, computer-readable media, comprising instructions that, when executed by one or more processors, cause operations comprises:

accessing a first input/output path to retrieve a standardized data representation in a computer programming language of a log of event data of a first process being performed by one or more components in a first software system;

accessing a second input/output path to retrieve first event data corresponding to the first process;

accessing, via an API layer, a first artificial intelligence model, wherein the first artificial intelligence model is trained by:

generating first training data based on historical software applications lineage logs that indicate respective time stamps, event names, components, or other data for known software system configurations of the one or more components performing known processes;

generating second training data based on historical event data, wherein the historical event data is labeled with the respective time stamps, event names, components, or other data for the known software system configurations of the one or more components performing the known processes; and training, using the first training data and the second training data, the first artificial intelligence model to similarities or differences between the historical event data and the historical software applications lineage logs;

determining, by the first artificial intelligence model, a first automated software code debugging operation based on comparing the similarities or the differences to the first event data to identify an anomaly in code of the first process; and executing the first automated software code debugging operation by re-writing code used to execute the first process to remove the anomaly.

17. The one or more non-transitory, computer-readable media of claim 16, wherein determining, by the first artificial intelligence model, the first automated software code debugging operation further comprises:

determining a first component of the one or more components;

determining a first expected component output of the first component when performing the first process; and comparing the first expected component output to the first event data.

18. The one or more non-transitory, computer-readable media of claim 16, wherein determining, by the first artificial intelligence model, the first automated software code debugging operation further comprises:

determining a failure likelihood for the one or more components based on the first event data; and determining first content for the first automated software code debugging operation based on the failure likelihood.

19. The one or more non-transitory, computer-readable media of claim 16, wherein determining the first automated software code debugging operation further comprises:

determining a first error in the log; and determining, based on the first event data, to throttle processes performed by the one or more components in response to the first error.

20. The one or more non-transitory, computer-readable media of claim 16, wherein determining the first automated software code debugging operation further comprises:

determining, based on the first event data, a first route through the one or more components when performing the first process;

determining, based on the first route, a first expected route through the one or more components when performing the first process; and comparing the first route to the first expected route.

* * * * *